United States Patent
Koch

(10) Patent No.: US 8,646,843 B2
(45) Date of Patent: Feb. 11, 2014

(54) ASSEMBLY APPARATUS FOR MODULAR COMPONENTS ESPECIALLY FOR UPHOLSTERED FURNITURE

(71) Applicant: Jon Russell Koch, Thomasville, NC (US)

(72) Inventor: Jon Russell Koch, Thomasville, NC (US)

(*) Notice: Subject to any disclaimer, the term of this patent is extended or adjusted under 35 U.S.C. 154(b) by 0 days.

(21) Appl. No.: 13/745,821

(22) Filed: Jan. 20, 2013

(65) Prior Publication Data

US 2013/0134763 A1 May 30, 2013

Related U.S. Application Data

(62) Division of application No. 11/827,954, filed on Jul. 13, 2007, now Pat. No. 8,356,954.

(51) Int. Cl.
  *A47C 17/02* (2006.01)
  *A47C 7/02* (2006.01)
  *A47C 27/00* (2006.01)

(52) U.S. Cl.
  USPC ............. 297/440.23; 297/440.15; 297/440.14

(58) Field of Classification Search
  USPC ................ 297/440.1, 440.14, 440.15, 440.23
  See application file for complete search history.

(56) References Cited

U.S. PATENT DOCUMENTS

| | | | | |
|---|---|---|---|---|
| 2,620,024 A * | 12/1952 | Rietman | ................... | 297/440.23 |
| 2,642,928 A * | 6/1953 | Bateman et al. | ......... | 297/440.23 |
| 2,650,656 A * | 9/1953 | Ohlsson | ................... | 297/440.23 |
| 2,650,657 A * | 9/1953 | Ohlsson | ................... | 297/440.23 |
| 3,526,433 A * | 9/1970 | Miller | ....................... | 297/440.23 |
| 3,700,282 A * | 10/1972 | Rowland | ................... | 297/440.23 |
| 3,704,911 A * | 12/1972 | Milakovich | ............... | 297/440.16 |
| 3,774,966 A * | 11/1973 | Faulkner et al. | ......... | 297/440.23 |
| 3,973,800 A * | 8/1976 | Kogan | ..................... | 297/440.23 |
| 4,077,517 A * | 3/1978 | Hilemn | ........................ | 206/577 |
| 4,165,902 A * | 8/1979 | Ehrlich | .................... | 297/440.23 |
| 4,178,047 A * | 12/1979 | Welch | ........................ | 312/140 |
| 4,199,907 A * | 4/1980 | Bains et al. | .................. | 52/122.1 |
| 4,251,969 A * | 2/1981 | Bains | ........................ | 52/584.1 |
| 4,266,386 A * | 5/1981 | Bains | ........................ | 52/481.2 |
| 4,363,201 A * | 12/1982 | Bains | ........................ | 52/584.1 |
| 4,473,316 A * | 9/1984 | Welch | ........................ | 403/246 |
| 4,555,139 A * | 11/1985 | Leib | ......................... | 297/452.31 |
| 4,620,747 A * | 11/1986 | Lemmon | .................... | 297/440.1 |
| 4,786,119 A * | 11/1988 | Smuda | ......................... | 312/195 |
| 5,080,438 A * | 1/1992 | Moyer | ..................... | 297/440.23 |
| 5,611,639 A * | 3/1997 | Levenberg | .................... | 403/397 |
| 5,890,767 A * | 4/1999 | Chang | ...................... | 297/440.14 |
| 6,109,819 A * | 8/2000 | Welch | .......................... | 403/353 |

(Continued)

*Primary Examiner* — David Dunn
*Assistant Examiner* — Tania Abraham
(74) *Attorney, Agent, or Firm* — Robert W. Pitts

(57) ABSTRACT

A connector assembly is used to connect subassemblies such as parts of a knockdown or modular sofa or similar item of furniture. The furniture item can be an upholstered item in which the multiple components are stackable into a volume that is smaller than the assembled item of furniture for shipping. The connector assembly includes a keyhole slot on a frame member in one component and a male connector assembly on a frame member in the other assembly. The male connector includes a sleeve with a cylindrical shank and an adjacent enlarged or conical portion, and the sleeve, which may be plastic, is mounted the bolt. The narrow section of the keyhole slot has a beveled surface and as the sleeve progresses into the narrow section, engagement of the conical sleeve section with the beveled slot surface tightens the two members being attached.

17 Claims, 21 Drawing Sheets

(56) References Cited

U.S. PATENT DOCUMENTS

| | | |
|---|---|---|
| 6,241,317 B1 * | 6/2001 | Wu ........................... 297/440.23 |
| 6,595,592 B1 * | 7/2003 | Wieland et al. ........... 297/440.23 |
| 7,213,885 B2 * | 5/2007 | White et al. ............... 297/440.1 |
| 7,252,339 B2 * | 8/2007 | Owens ....................... 297/440.1 |
| 7,300,111 B2 * | 11/2007 | Huang ..................... 297/440.16 |
| 7,387,344 B2 * | 6/2008 | Yu .............................. 297/440.1 |
| 7,547,073 B2 * | 6/2009 | White et al. ............... 297/440.1 |
| 7,744,162 B2 * | 6/2010 | Griggs, Jr. ............... 297/440.14 |

\* cited by examiner

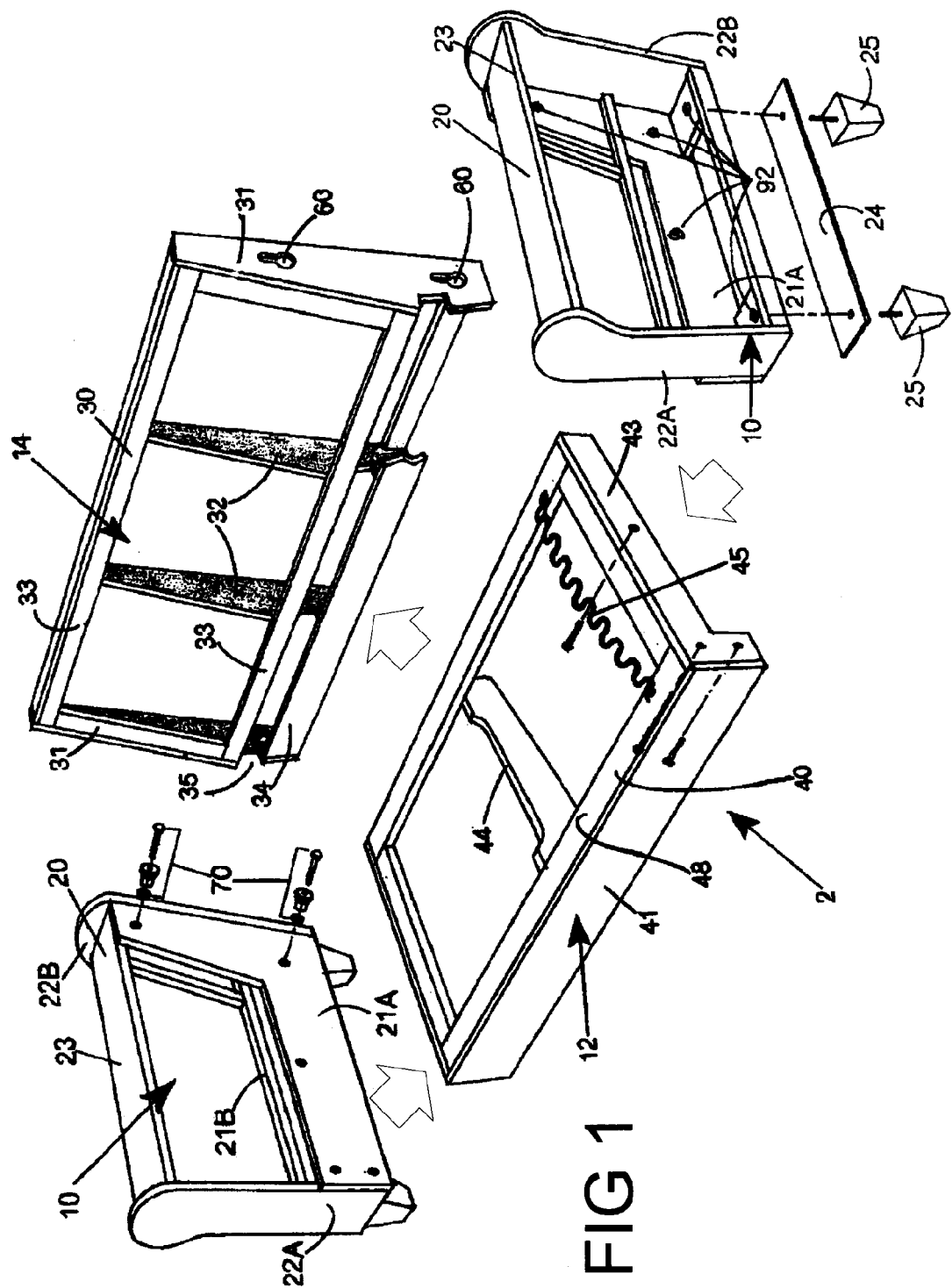

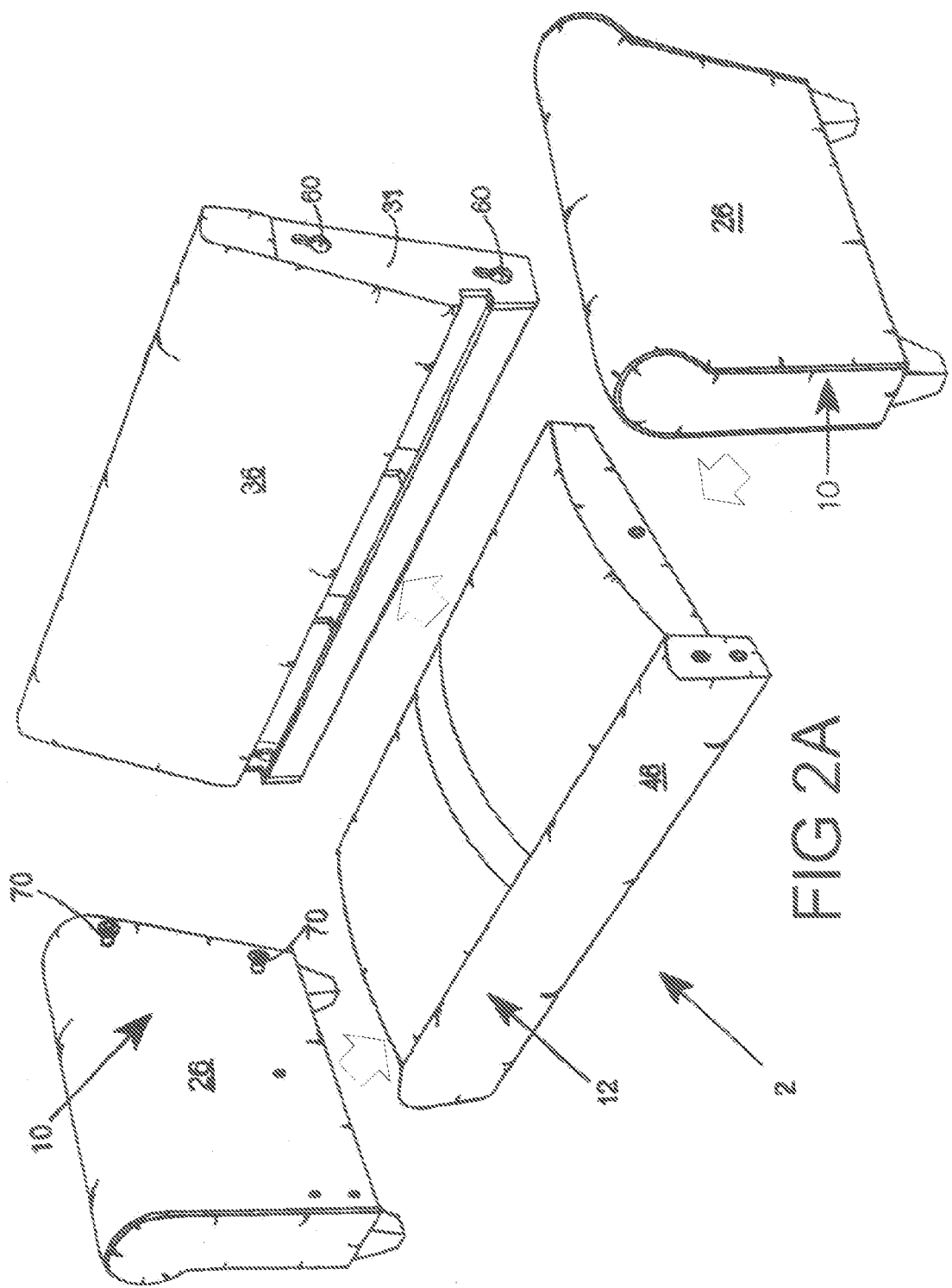

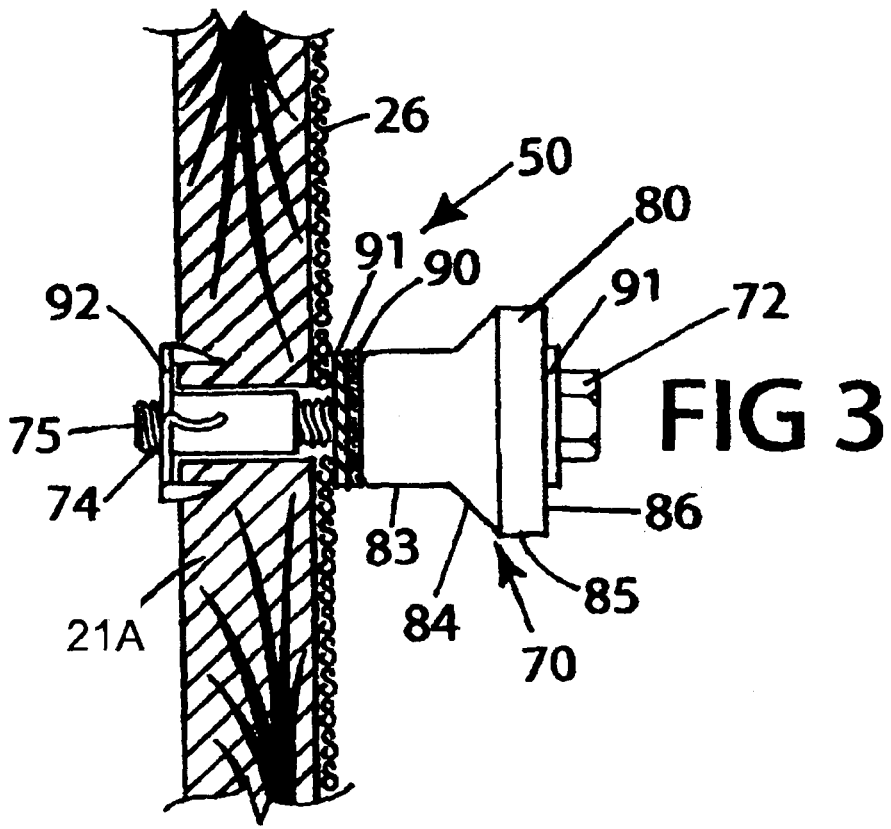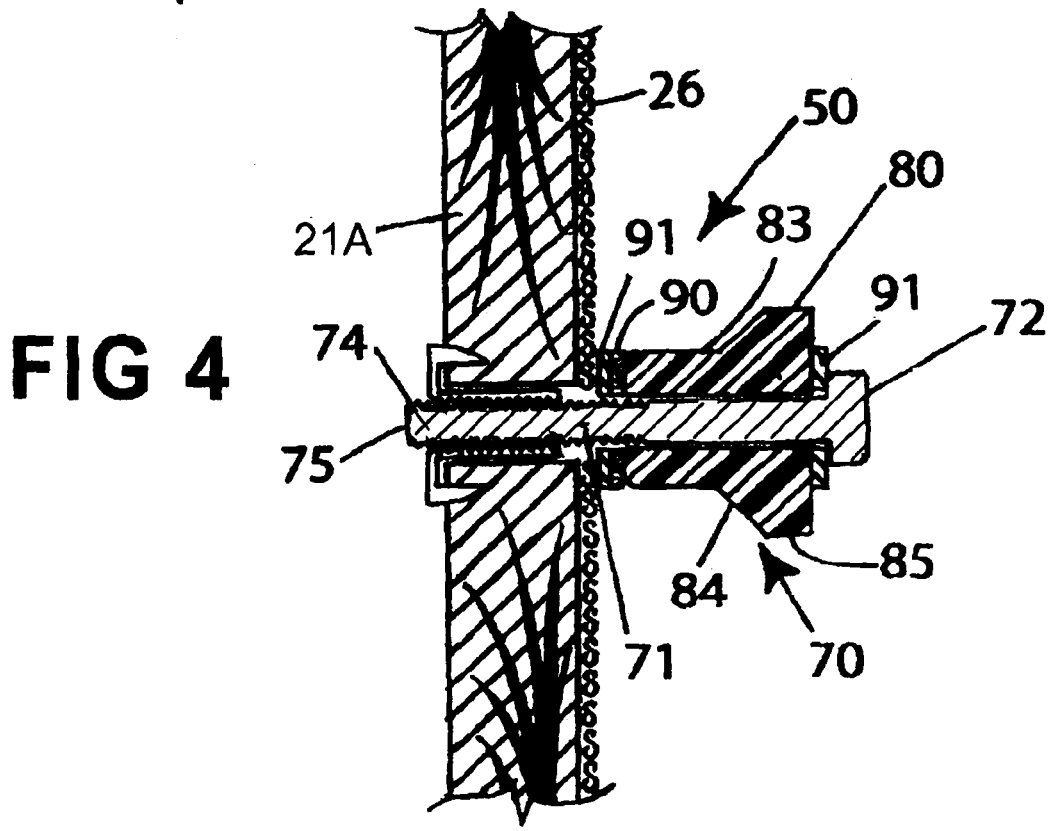

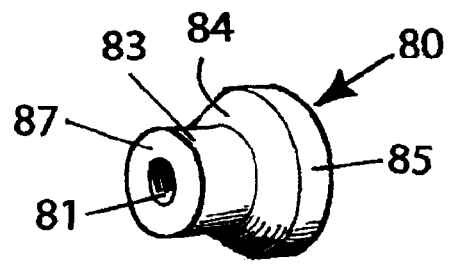
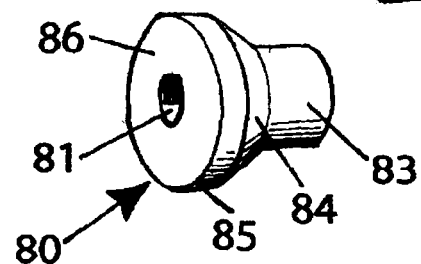
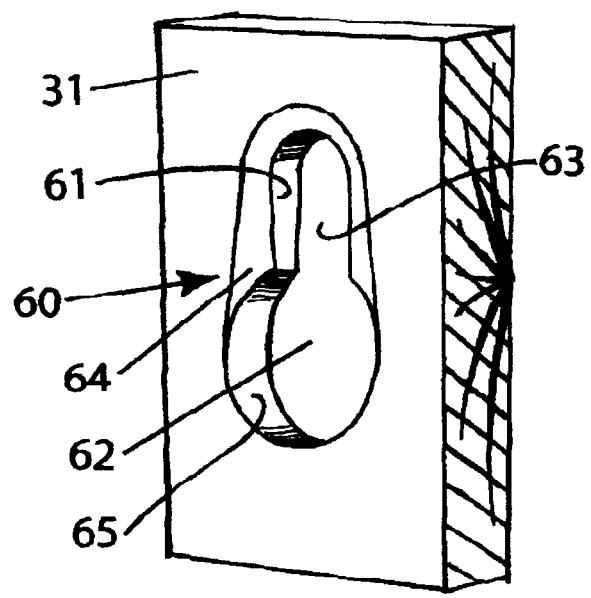

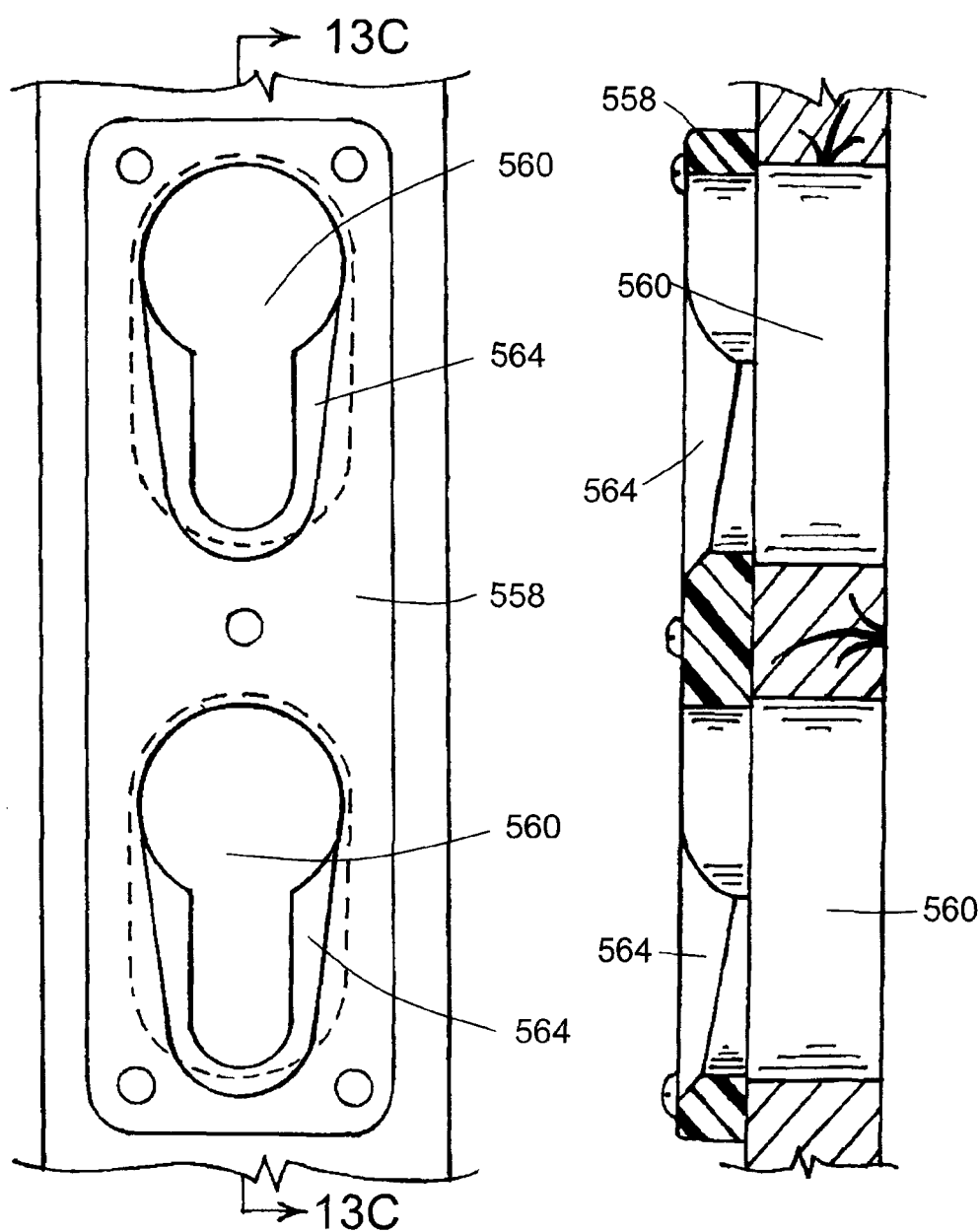

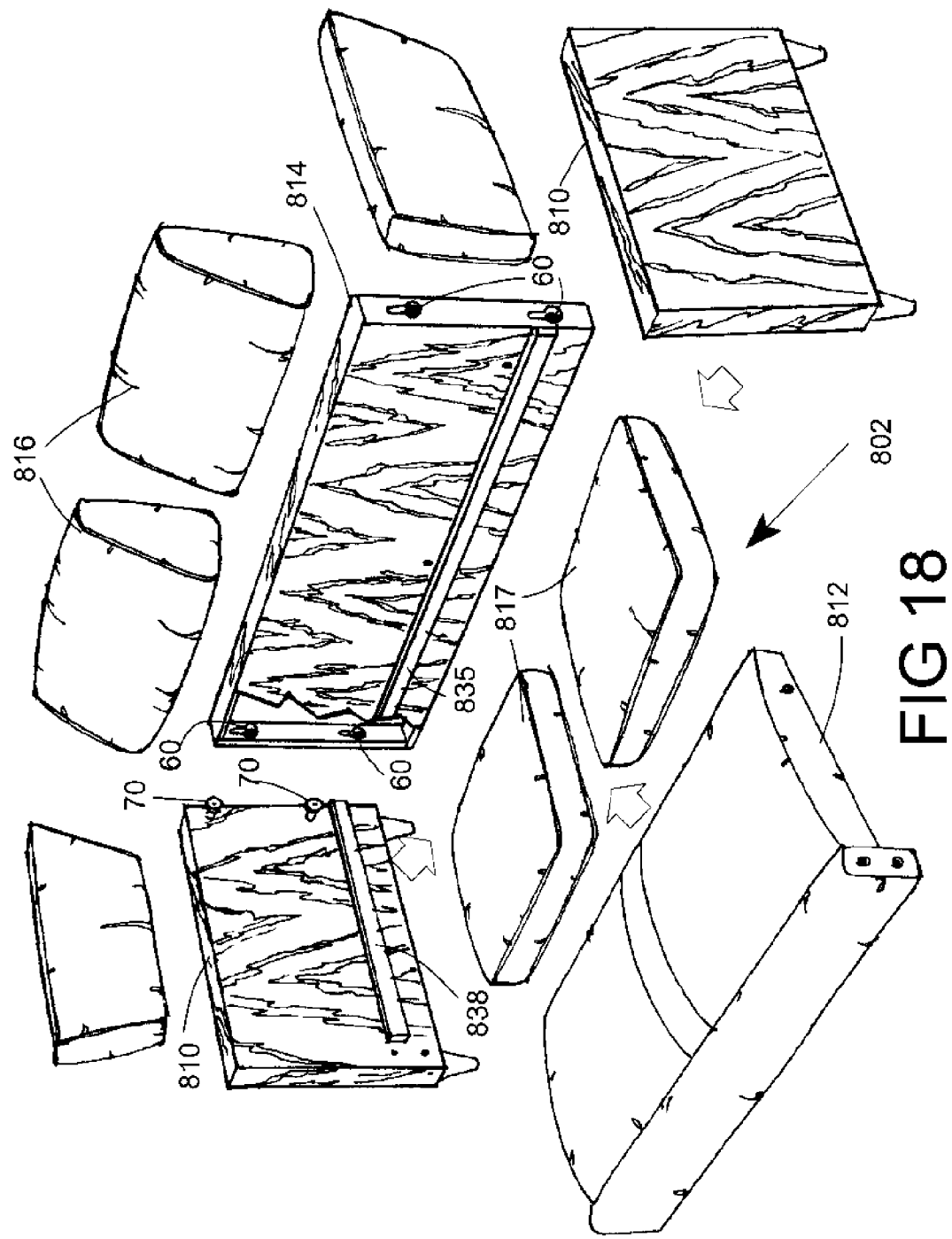

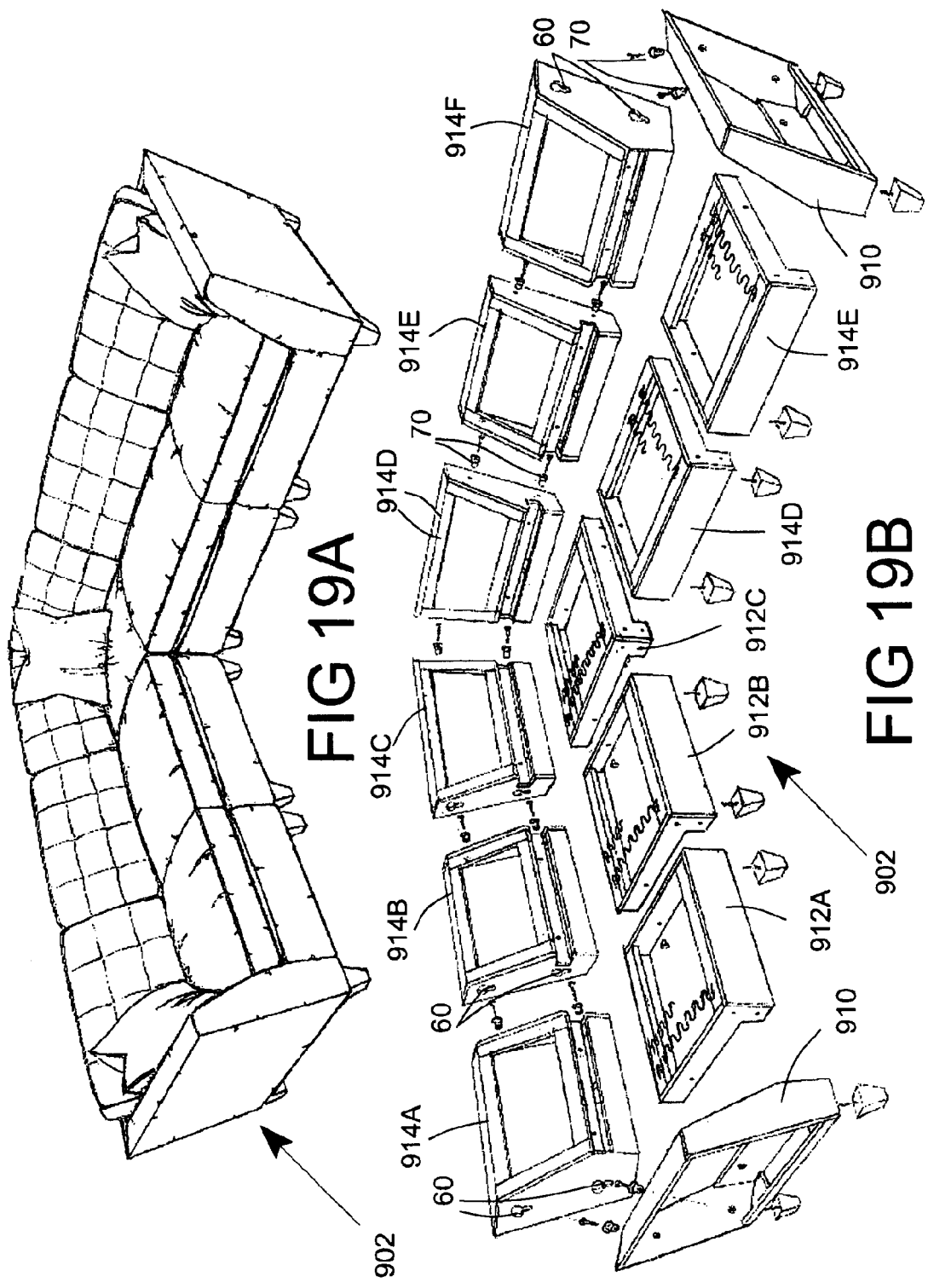

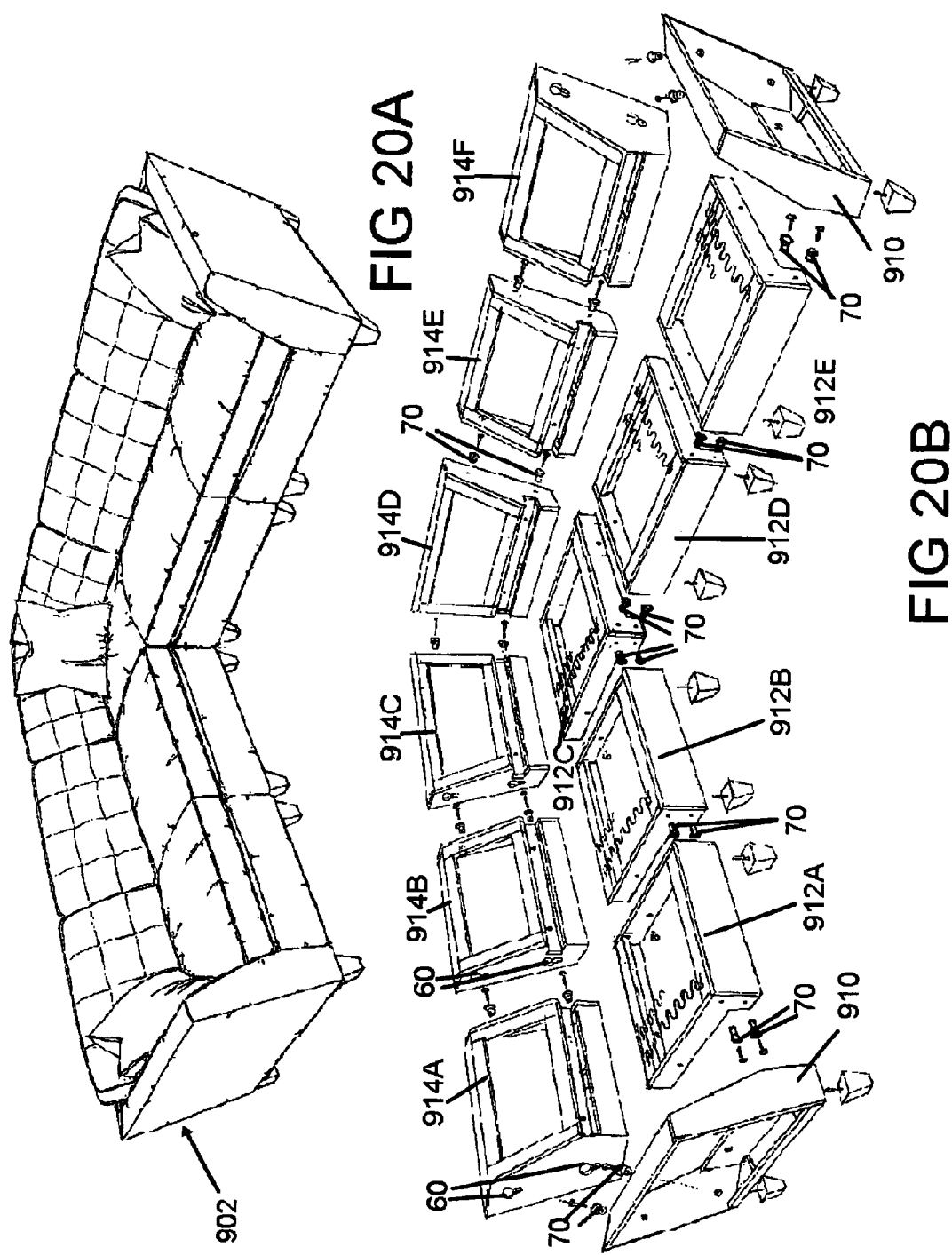

ASSEMBLY APPARATUS FOR MODULAR COMPONENTS ESPECIALLY FOR UPHOLSTERED FURNITURE

CROSS REFERENCE TO PRIOR CO-PENDING APPLICATION

This application is a divisional of prior co-pending application Ser. No. 11/827,954 filed Jul. 13, 2007.

BACKGROUND OF THE INVENTION

1. Field of the Invention

This invention relates to an apparatus suited for field assembly of manufactured items, especially for use with ready to assemble, modular or knockdown upholstered furniture. This invention also relates to connectors comprising male fasteners that can be inserted into keyhole slots both to lock components together and to tighten the connection between the components to form a sturdy final assembly.

2. Description of the Prior Art

Knockdown, ready-to-assemble (RTA) or modular are terms employed to describe furniture in which components or subassemblies are manufactured, packaged and then shipped, with final assembly normally being left to the purchaser. The advantages of employing items of this type include the ability to reduce transportation costs as well as to pass the cost of final assembly to the purchaser. However, the disadvantages include: inferior quality associated with either inadequate stability or exposed exterior connectors that detract from the appearance; the limitations on aesthetic designs imposed by concealing connecting methods inside an upholstered item; and the inability to realize enough savings from reduced transportation costs and purchaser's assembly to overcome the extra manufacturing costs related to an RTA upholstered item.

The globalization of furniture manufacturing has magnified the importance of the cost of shipping finished product to a global retail market. The profitability and subsequent successful utilization of most RTA systems hinge upon the total savings from reduced transportation costs and assembly by purchaser being at least equal to and preferably greater than the extra costs of manufacturing an item employing an RTA system. The most successful knockdown, ready-to-assemble or modular furniture items tend to be products, such as tables, desks and chairs.

The primary advantage of shipping these items in an unassembled state is the large reduction of the cubic volume of the parts relative to the assembled item. Tables when assembled are mostly space. When the unassembled parts are packaged, there are significant savings in transportation costs which offset the extra expense of employing the extra RTA engineering and manufacturing costs. For example: a dining table 48"×48"×30" equals about 40 cubic feet of shipping volume. The same table, (depending on its design) could easily be packaged in an unassembled state in a box 70% smaller, requiring 12 cubic feet of shipping. The difference of 28 cubic feet of shipping volume, at a cost of $2.00 per cubic foot, (current overseas container shipping costs), translates into an initial savings of $56.00 per table. The economical advantages of this smaller package are further increased if additional transportation and warehousing costs are considered.

It is much more difficult to reduce the cubic feet of an upholstered item of furniture because the volume required by the structure of the frame, the foam and cushions is significantly greater in proportion to the total volume of the assembled item in comparison to a table. Most RTA upholstered systems enhance the ability to handle the individual components for final delivery in tight quarters, but do not strategically address critical shipping logistics. The ability to break an upholstered item down into individual parts does not automatically translate into significantly reducing shipping costs. U.S. Pat. No. 5,678,897 is an example of a system that comprises components that can be shipped in an unassembled manner. However, this prior art approach does not appear to greatly reduce the volume in which this item can be shipped.

Tables and similar items which successfully employ RTA systems are generally made of solid components such as wood, metal and cast resin. The leg and support members by reason of the openness of the structure afford easy access for assembly. Upholstered furniture is however more difficult to fabricate by this method because the access to connecting fasteners hidden inside of the upholstered components is limited. In addition if accepted standards of quality and the performance of seating products which are subjected to the stress and constant movement of one or more person's full weight are to be achieved, the fasteners or connectors must be reliable and considerably stronger than those employed in lighter duty applications. Some upholstered furniture does employ fasteners or connectors for the final steps of assembly. For example, the backs of recliners are typically assembled to the base with co-operable metal fasteners. However, significant assembly of the other components are necessary, and even the final assembly of the recliner back is not normally considered to be a final assembly step, nor are the recliner bases and backs shipped separately. Modular sofas also commonly employ metal fasteners to prevent adjacent modular components from slipping apart, but the individual modular sofa units are typically fully manufactured in a factory, and the purpose of modularity is to allow the purchaser to arrange the modular components in different configurations. The connectors are primarily intended to stabilize the units that are positioned side by side. In each of these configurations almost all of the manufacturing is completed in a factory setting.

There have been suggestions for field assembly of upholstered furniture. U.S. Pat. No. 5,678,897 is one example of ready to assembly upholstered furniture. That device is an example of a device in which multiple special connectors are needed to attach sofa arms to a sofa back and to a sofa deck, and it is apparent that special attention to the manner in which cushions must be compressed prior to assembly is necessary, and it is an example in which special access to the interior of the components is necessary for assembly.

U.S. Pat. No. 6,267,446 and U.S. Pat. No. 6,981,747 are examples of similar approaches for fabricating an upholstered sofa or chair where the final assembly can be a field assembly. The approach adopted in these two patents and related patents is to provide a means for assembling a frame in the field, after which the frame is covered by preassembled cushions. This approach provides one method of packaging the components, prior to assembly, in a relatively small space to reduce the cost of shipping the components. However, it would appear that this approach is limited to certain styles because the design of the structural members out of OSB panels is so radically different from normal upholstery frame design. Further limitations stem from the utilization of preformed arm and back cushions and covers fitted over the frame after field assembly of the frame. It is not apparent that this approach could be adapted to upholstered furniture having the styles and designs that would appeal to many, if not most, customers, and this approach may not be applicable to higher style items.

U.S. Pat. No. 6,942,298 is another example in which sofa components can be assembled in the field to take advantage of shipping the sofa in pieces. It is suggested that the frames of that device can be assembled in the field and that a pliable material can be upholstered to the frame either before or after the frame is assembled. However it would appear that the type of upholstery would be limited by the need to access the interior of the components, and this issue does not appear to have been addressed.

Although keyhole slot configurations have been employed to connect furniture components, their use has primarily involved connection of panels and wooden member for desks, chairs, tables and items of this type. The advantages of keyhole slot configurations in both improving the structural stability and rigidity of upholstered furniture items, and at the same time reducing the space necessary to ship furniture items in a preassembled state does not appear to have been previously addressed.

SUMMARY OF THE INVENTION

The instant invention is directed to field assembly of items, especially upholstered furniture, in which simple fastening means are employed so that the upholstery need not be disturbed during assembly and in which access to the interior of the components or subassemblies is not required. This invention permits final field assembly of an upholstered sofa or similar furniture piece, and this furniture can be disassembled and reassembled by the owner, without the need for special tools and does not require experienced assistance or service.

This invention employs keyhole slot connector configurations that not only simplify field assembly, but also tighten assembled components to provide a sturdy configuration comparable to that achieved with high quality, factory assembled items of upholstered furniture. These keyhole slot configurations are also important as a means for constructing subassemblies that can be shipped in smaller spaces and can allow more cost effective shipping, including the ability to ship more preassembled furniture items in standard marine containers. Mail and Internet orders can be easily shipped by conventional means because the shipping boxes are not bulky. These upholstered furniture pieces are therefore portable and can be easily assembled and disassembled even by a novice.

This ready to assemble, knockdown or modular furniture can also be as stylish as furniture that is assembled in a factory, and the assembly technique and components are adaptable to most if not all high quality items in all common styles.

A connector assembly according to this invention provides a completely blind connection without the need to access any of the interior cavities of the furniture components. To obtain a secure sturdy connection, previous knockdown (KD) and ready to assemble (RTA) furniture systems require access to the interior cavity of one or more of the furniture components to tighten connectors. To obtain a sturdy blind connection, traditional KD and RTA systems in which access to the interior is necessary to tighten or join upholstered furniture components require removal of layers of foam and external upholstered material to access mechanical connectors or provide an exterior slip cover. In order to maintain a sturdy blind connection these constraints severely limit the range of aesthetic designs compatible with these systems. The method of assembling components provided by this invention overcomes these limitations because the upholstery on each furniture component is permanently fixed in place with the standard traditional upholstery methods and it is not necessary to disturb the preassembled upholstery or foam in order to assemble or disassemble furniture components. This improves the durability of the upholstered materials and results in an assembled article of furniture, which looks and functions as well as a comparable design built and factory assembled on a traditional one piece frame. There are almost no limitations to the type of style and design that employs blind connector of this invention. Even complex curved frames and multiple seating groupings are within the effective applications of this system.

In addition to the aesthetic advantages of this system, the connector assembly of this invention includes the capability of connecting furniture components securely even though the manufacturing tolerances and subsequent field assembly tolerances can be as great or greater than $+\frac{1}{16}$ inch. The factors leading to such large tolerances may include variances in the manufactured dimensions of the wood frame members and normal tolerance issues related to the manufacture of subframe assemblies. As furniture components are shipped across the oceans, warehoused for periods of time and finally set up and utilized for years, it is possible that changes in weather and climate, and atmospheric conditions can result in warping of internal frame members resulting in changing tolerances for individual connectors. A second set of variables is the type of fabric on the furniture component to which the male connector of this invention is attached, as well as other upholstered fabric and filler adjacent to the mating surfaces of both furniture components that may need to be compressed. The type of fabric and the variations in the individual tailoring of the upholstery on each item may impact the individual tolerances of each connector.

These are very serious challenges to maintain a reliable, tight fitting blind connector that cannot be tightened internally on assembled furniture components with the tolerance issues described above. Traditional furniture connectors joining two or more components together that form a blind connection typically require close tolerances both in the manufacture of the separate connector parts itself, and the insertion of multiple connectors into the furniture components must be exact and the members of the furniture components themselves, i.e. wood members, must be perfectly flat and aligned perfectly in relation to each other for connectors to engage and properly function. All this requires very tight tolerances and a very high level of sophisticated manufacturing techniques. Concealed connectors of furniture components that must be assembled in the field, which also have the ability to compensate for varying misalignment and tolerance issues, typically require complex engineered components. One example is the three-way adjustable door hinges used on cabinet doors. Those prior art hinges are very effective, but complicated.

Versions of an upholstered sofa according to this invention can be shipped in pieces and is suitable for field assembly. This sofa includes a sofa back, a pair of sofa arms, and a sofa deck. Connectors are positionable between the sofa back and the sofa arms to attach the sofa arms to the sofa back. The connectors are covered by the sofa arms and the sofa back upon assembly of the sofa arms to the sofa back. The sofa deck is upholstered on front, top and sides thereof, but includes open compartment means dimensioned for receiving other parts of the sofa side by side for shipment in an unassembled configuration.

According to another aspect of this invention, a sofa suitable for field assembly and field disassembly includes a plurality of seat back sections and separate seat deck sections and arms forming opposite ends of the sofa. The individual seat back sections are joinable end to end to form a seat back that can be field assembled and field disassembled and the individual seat deck sections being joinable end to end to form a seat that can be field assembled and field disassembled. The arms are attachable to opposite ends of the seat back and the seat deck, and the individual seat back sections include connectors on one end thereof and a keyhole slot on opposite ends thereof. The connectors are insertable into keyhole slots of adjacent seat back sections. The connectors include a male fastener with a sleeve extending around the male fastener. The sleeve includes a radially projecting conical section extending from a cylindrical shank section, the sleeve extending beyond the seat back to which the connector is mounted. The keyhole slot has an alignment section of the keyhole slot into which a connector can be inserted for subsequent relative movement of one seat back section relative to an adjacent seat back section moves the sleeve laterally of its axis into a portion of the keyhole slot narrower than the alignment section to secure seat back sections together. The narrower portion of the keyhole slot extends from the alignment section with opposed slot bearing surfaces with beveled edge surfaces extending outwardly away from the bearing surfaces. The beveled edge surfaces are also inclined toward a closed end of the narrower portion spaced from the alignment section so that the slot bearing surfaces are thicker adjacent the closed end of the narrower portion than adjacent the alignment section so that insertion of the conical section into engagement with the beveled and inclined edge surfaces of the keyhole slot will further tighten the one seat back section relative to the adjacent seat back section and the sleeve cylindrical shank section will be positioned between the slot bearing surfaces.

According to another aspect of this invention, an upholstered seating item of furniture, such as a sofa or similar item, includes a first upholstered furniture component and a second upholstered furniture component. At least one female connector member is located on said first upholstered furniture component. The female connector member includes a key hole slot with a beveled edge extending away from the slot and in which the thickness of the female connector member increases from an entry section of the key hole slot to a closed end of the key hole slot. A male connector member on a second upholstered furniture component has a conical section insertable in the keyhole slot to attach the first upholstered furniture component to the second upholstered furniture component. Upholstery material on at least one of the first and second upholstered furniture components is sandwiched between the first and second upholstered furniture components when attached. The conical section engages the beveled edge of the keyhole slot to tighten the attachment of the first and second furniture upholstered components despite dimensional variations due to variability of the upholstery material.

BRIEF DESCRIPTION OF THE DRAWINGS

FIG. 1 is an exploded three dimensional view of the frame components for a sofa that can be assembled according to this invention.

FIG. 2A is an exploded three dimensional view of upholstered sofa that can be subsequently assembled according to this invention, in which the upholstery surrounds the frame components shown in FIG. 1.

FIG. 3 is a side view of a male connector or fastener assembly mounted on one of the frame members, such as a sofa arm frame member, prior to use of the male connector or fastener to assemble the sofa from the individual upholstered furniture components.

FIG. 4 is a sectional view of the connector or fastener assembly of FIG. 3.

FIGS. 5A and 5B are three dimensional views of a sleeve comprising one of the components of the male connector or fastener assembly shown in FIGS. 3 and 4.

FIG. 6 is a three dimensional view of a keyhole slot formed in one of the frame members of an upholstered furniture component that will be attached to another furniture component on which a male connector of the type shown in FIGS. 3 and 4 has been mounted.

FIGS. 13A through 13C show another version of the connector assembly in which the keyhole slot can be molded from a plastic or other resinous material and in which multiple keyhole slots can be molded in the same female member to provide additional strength.

FIG. 18 is a view of another sofa in which portions of the sofa are exposed wood. FIG. 18 also shows the manner in which the connector assembly can be used in areas in which access to the interior of sofa components is very difficult if not impossible.

FIGS. 19A and 19B are views of a modular sofa in which the components can be assembled and disassembled in the same manner as the other embodiments.

FIGS. 20A and 20B are views of a modular sofa in similar to that shown in FIGS. 19A and 19B in which connectors according to this invention are used to connect both adjacent seat backs and adjacent seat decks.

DETAILED DESCRIPTION OF THE PREFERRED EMBODIMENTS

Figure 2B:
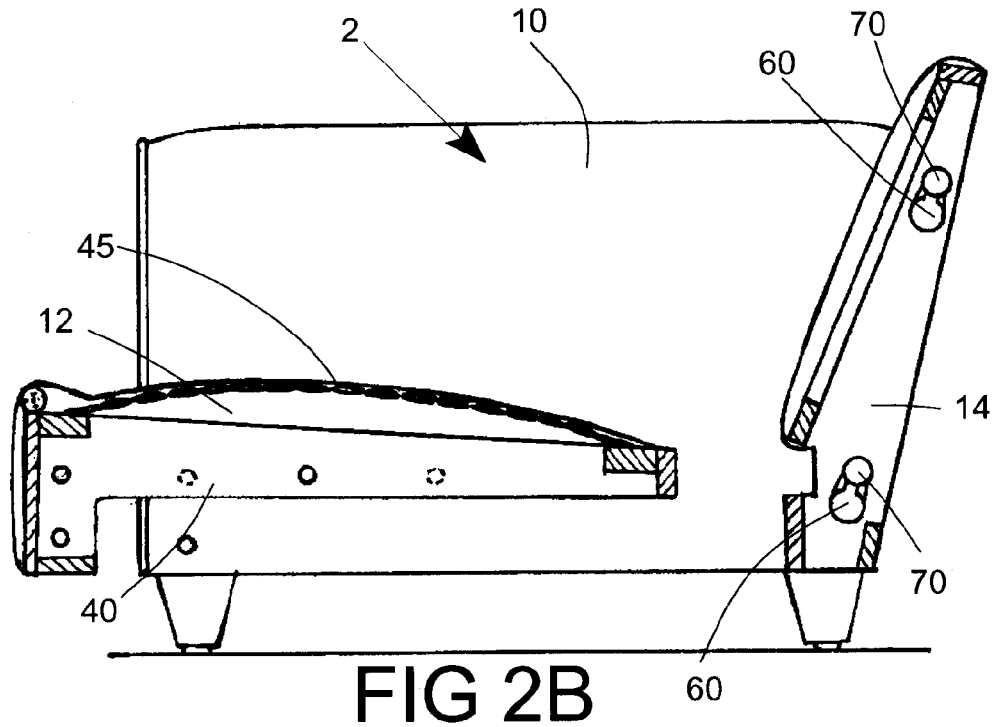
FIGS. 2B and 2C are side views showing the manner in which the sofa deck or seat is mated with the sofa back.

Subassemblies or components of a final assembly, such as an upholstered sofa 2, can be fabricated and shipped for final assembly using the connector apparatus 50 of the instant invention. Although this connector apparatus 50 can be advantageously used to simplify and improve the final assembly of furniture subcomponents or subassemblies, it is not limited to use with furniture. The furniture assemblies depicted herein are merely representative of the use of this connector assembly 50. However, the connector apparatus 50, or multiple connectors can be employed to assemble the various principal furniture components, such as a sofa deck, sofa arms and sofa arms together. Therefore, the term components or furniture components, as used herein, can refer to any of the components of a piece of furniture, including for example the sofa deck, the sofa back and the sofa arms, and when the terms first and second components are used herein these terms refer to the assembly of two components together in the absence of a more specific meaning that would be apparent from the context in which these terms are used. The major furniture components also include furniture frames, and the terms first and second frames would refer to the frames of the first and second furniture components. Since the connectors can be used to attach different components, the designations first and second are not intended to always refer to a specific furniture component or furniture frame.

The connector assembly 50 includes a male connector or fastener apparatus 70 that can be attached to a frame member including a keyhole slot configuration 60, so that two components or subassemblies can be assembled by first inserting the male connector apparatus 70 into large alignment or entry portion 62 of a keyhole slot 60 and then imparting lateral movement between the two components so that the male connector apparatus enters a narrower slot section 63 of the keyhole slot. In the preferred embodiment of this invention this connector assembly 50 provides a simple and effective manner of assembling and securing sofa arms 10 on opposite sides of a sofa back 14. This connector assembly 50 allows subcomponents or subassemblies, such as sofa arms 10 and a sofa back 14, to be reliably field assembled, to form a strong, functional and fashionable sofa 2, and therefore permits relatively inexpensive shipment of the subcomponents or subassemblies in a relatively small volume. In the preferred embodiment depicted herein, an upholstered sofa 2 consisting of two sofa arms 10, a sofa deck 12, a sofa back 14, sofa back cushions 16 and sofa seat cushions 17, and assorted sofa pillows 18 can be shipped in a rectangular volume minimizing space needed in a shipping container. A relatively large number of disassembled items of furniture can be shipped in this manner with little lost space and substantially filling standard shipping containers. In the representative embodiment depicted herein, an upholstered sofa 2 having a standard height of thirty one (31) inches, and width of eighty nine (89) inches and a depth of thirty nine (39) inches can be shipped in a rectangular space having a width of thirty (30) inches, and height of thirty (30) inches and a depth of seventy two (72) inches. Thus the shipping volume is significantly less than the volume of the sofa 12 after final assembly, and a large number of items of furniture or other items can therefore be more efficiently shipped.

The instant invention is especially suitable for use with knockdown upholstered furniture, such as the upholstered sofa 2 shown in FIG. 2. Each of the primary components or subassemblies of sofa 2 are upholstered before final assembly of the various components or subassemblies. Layers of upholstery can be professionally applied to the sofa arms 10, the sofa deck or seat 12 and the sofa back 14 before final assembly of these parts. In other words, the upholstery can be applied in a factory where special skill is available to insure proper fit and function and quality, which can be especially important for the final product. However, final field assembly can be delayed until the upholstered subcomponents or subassemblies have reached their ultimate destination or until they have reached a retail or display location. The connector apparatus 50 will allow field assembly of the components in a manner that will not detract from the appearance of the factory installed upholstery and will be compatible with the tolerances and fit issues that are applicable to this type of furniture.

The primary subcomponents of the upholstered sofa 2 are fabricated by first fabricating a frame comprising a plurality of frame members preferably fabricated from wood. Although higher quality products will employ lumber sawn to predetermined dimensions, it is also possible to employ wood byproducts, such as plywood or oriented strand board, for less expensive versions of items of furniture of this type. The frame members and frame components of sofa 2 are shown in FIG. 1. If the sofa arms 10 are identical then the sofa frames 20 will also be identical. However, in many if not most cases, the left and right sofa arms 10 will not be identical, as is the case with the left and right sofa arms 10 and sofa arm frames 20 are not identical, but are effectively minor images of each other. However, the same basic frame members are employed in each sofa arm 20, each of which has a generally L-shaped side frame rails referred to as inside arm rail 21A and a side pull rail 21B. T-nuts 92, which will form part of the connector assembly are mounted on the inside arm rail 21A, and they are in alignment with holes formed at selected locations. As seen on the right arm frame, the male connector fastener assembly extends inwardly from inside arm rail 21A. The arm frame segments 22A and 22B on the front and rear of arm frame 20 define the basic curved shape of sofa arms 10 and top arm frame 23 and bottom arm frame 24 extend between the front and rear frame segments 22A and 22B. Feet 25 are attached to the bottom arm frame member 24. The various arm frame segments are assembled together to form a rigid structure and an interior arm storage compartment 27 will be bounded by the frame segments forming arm frame 20. The bottom rail or frame member 24 may be detachable or may not be permanently secured to the other frame segment to permit access to the arm storage compartment 27, as will be subsequently described in more detail. Upholstery layers 27 can then be tacked to the arm frames 20 in a professional manner to form the sofa arm subassemblies shown in FIG. 2A. The male connector devices 70 can be secured to the sofa arm frames 20, either before or after the upholstery layers 27 are applied, but in any event, suitable openings will be left in the upholstery so that the male connector devices 70 extend beyond the exterior upholstery surface 27. Openings for conventional fasteners for attaching the sofa arms 20 on opposite sides of sofa deck 12 are also provided.

In the embodiment of FIG. 1, the sofa back frame 30 is a rigid frame formed by attaching wooden frame members by conventional means. Back frame posts 31 have multiple keyhole slots 60 cut or routed adjacent the top and bottom of both the left and right back frame posts 31, although the keyhole slots 60 in the right back post 31 are not visible in FIG. 1. In addition to the upright back frame posts 31, two upright back support frame segments 32, having a shape similar to the side frame segments or posts 31 are evenly positioned so that the four upright frame segments 31 and 32 provide vertical rigidity to the sofa back frame 30. Top and bottom lateral stringers 33 are attached to the upright segments or posts 31 and 32, which extend between stringers 33 and form a face frame. A birdsmouth slot 35 is formed beneath lower stringer 33 by notches cut into each of the upright frame posts 31 and 32 and a bottom stringer 34 extends along the entire length of the sofa back frame 30. As will be subsequently described in more detail, birdsmouth slot 35 will be used to connect sofa deck 12 to sofa back 14 because the respective frame members will fit together so that the sofa deck 12 supports the sofa back 14. A layer of upholstery material 36 will be professionally attached to the sofa back frame 30 to form the sofa back 14 shown in FIG. 2A. FIG. 2A shows a configuration in which portions of the frame posts 31 are not covered by a layer of upholstery material so that keyhole slots 60 are exposed. In this embodiment the sides of sofa back 14 will engage opposed surfaces near the rear of sofa arms 10 so that the exposed frame posts 31 will not be visible. However, in other designs, the frame posts 31 can be completely covered with slits formed in alignment with keyhole slots 60 so that the male connector 50 can extend through upholstery slits into aligned keyhole slots 60. The extent to which the upholstery layer 36 covers the sofa back frame posts 31 will depend on the precise design of the specific sofa 2.

Figure 2C:
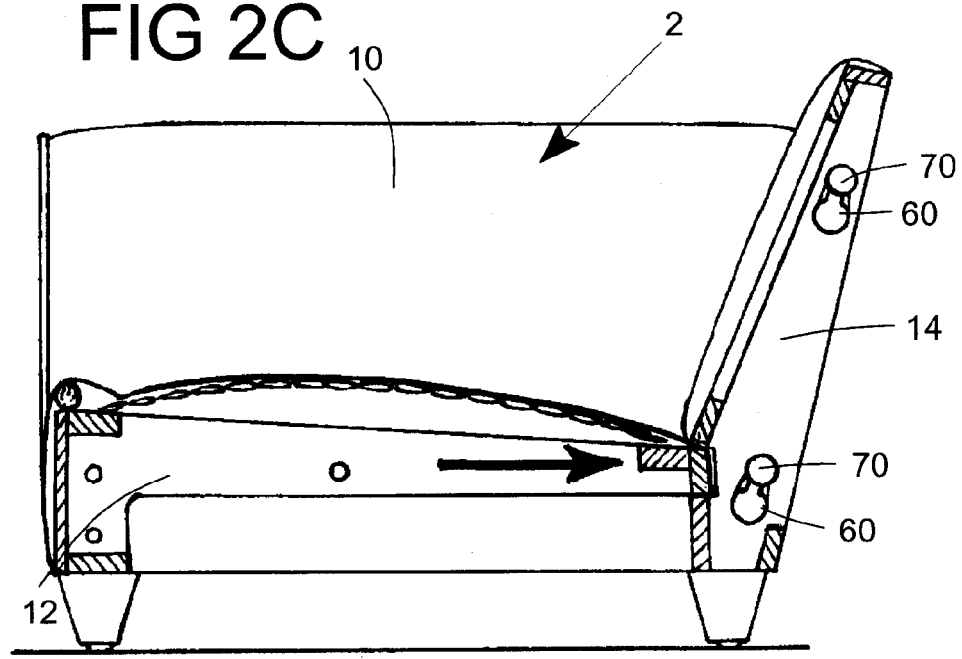
Figure 15:
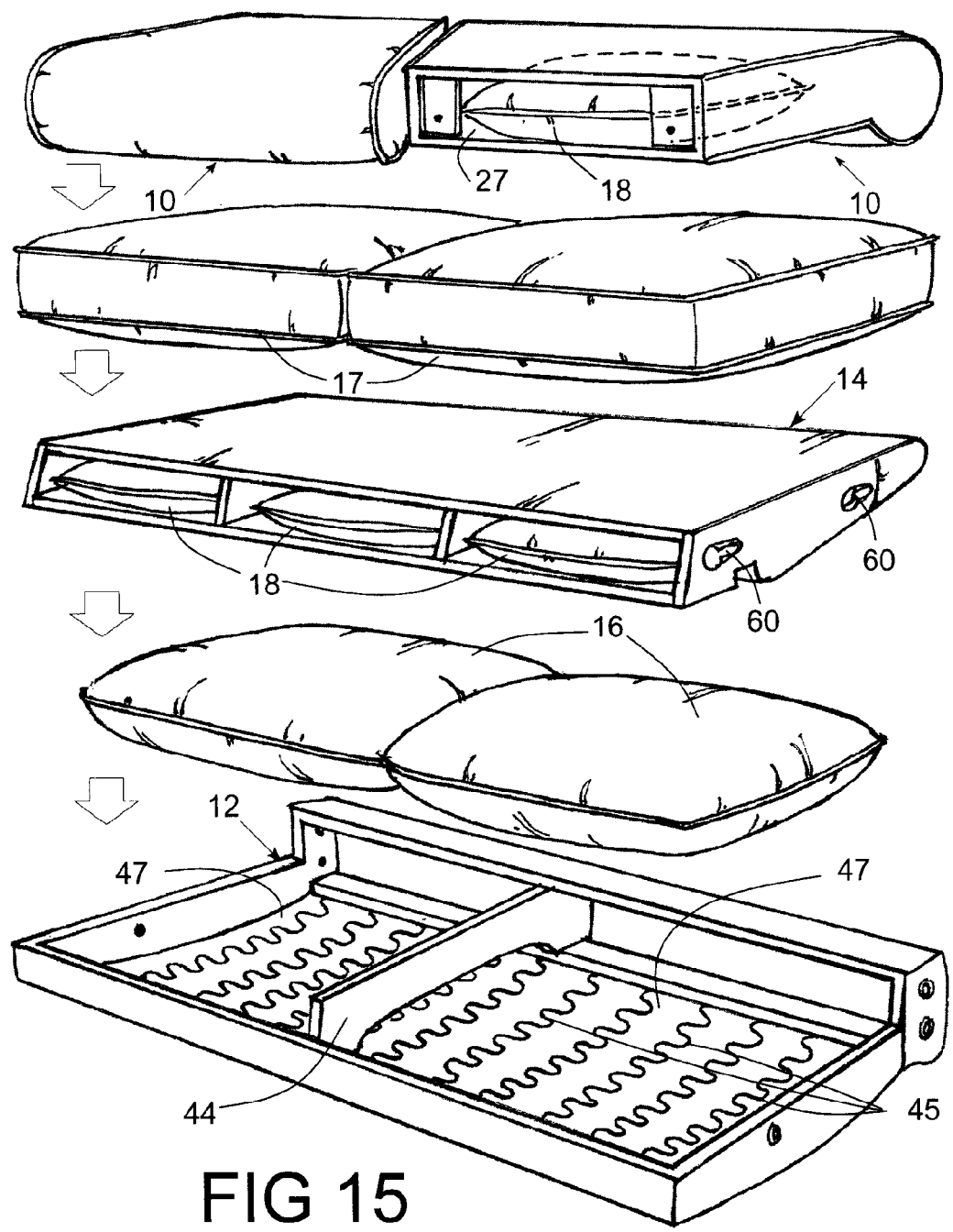
FIG. 15 is a three dimensional view showing the manner in which all of the components of the sofa shown in FIG. 2 can be stacked for shipment minimizing the volume of the shipped, but unassembled assembly.

Sofa deck or seat 12 is also formed of a deck frame 40 comprising a plurality of conventionally fabricated frame segments, preferably formed of sawn planks, such as hard wood, plywood or oriented strand board, with a layer of deck upholstery 46 covering at least a portion of the sofa deck 12. In this embodiment, an exposed layer of upholstery material 46 will cover a deck front rail 41, but a different material, such as typical seat decking material, can be used to cover the seat section, because this material will be covered by sofa seat cushions 17 when the sofa 2 is in use. The deck frame 40 is a rectangular structure formed by front rail 41, rear rail 42, best seen in FIG. 2B, both of which are joined by two side beams 43, and a central arched beam or spreader rail 44. A seat frame 48 includes four pieces nailed the rails to form the rectangular seat frame extending around the periphery of the deck frame 40. The two side rails 43 include a projection on the front so that each rail is generally L-shaped and has a greater width at the front than at the rear. This provides a surface for nailing or otherwise attaching the front rail 41, which will provide the lower face of the upholstered sofa 2. The central beam 44 is arched or recessed so that adequate space is provided so that the seat can deflect and an occupant sitting in the middle of the sofa 2 will not feel this central support beam 44. A series of deck no-sag springs 45, only one of which is shown in FIG. 1, extend from the front to the back of the sofa frame 40, and these deck springs 45 are strong enough to support occupants of the sofa. As seen in FIGS. 2B and 2C, the rear rail 42 can be inserted into the birdsmouth slot 35 on the sofa back and the sofa back 14 will support the rear of the deck 40. As best seen in FIG. 15, the central portion of the sofa deck 12 does not extend below the springs 45, although a thin cover may be positioned below these springs 45. A deck storage compartment 47 thus opens onto the lower surface of the sofa deck 12, and sufficient space will be provided in which seat back cushions 16 or other cushions or pillows can be inserted, when the sofa components are stacked for shipment. The advantages of stacking the components in this fashion will be subsequently discussed in more detail. The open storage compartment 47 also provides access so that conventional fasteners, such as screws, bolts or nails may be used to secure the sofa deck 12 to the sofa arms 10. Preferably nuts are attached to the inner side walls 21 of the sofa arm frame 20 so that threaded fasteners may be inserted from the inside of the sofa deck frame 40 to secure the sofa arm frame 20. Holes or slits may be provided in the upholstery layers 46 and 26, or any other covering to allow the threaded fasteners to be inserted into nuts or other attachment means in the sofa arm frames 20. In the embodiment depicted herein, the sofa deck or seat 12, and its occupants will be supported by the sofa arms 10, which are the only components resting on the floor. Of course additional supports may be installed on the sofa deck 12 or on the sofa back 14 is desired or if required when this invention is employed to construct a longer sofa than the representative embodiment depicted herein.

The connector assembly 50 providing the ability to connect or attach furniture components not only provides for a simple method of connecting the components, but also provides a simple method of disconnecting these same components or subassemblies. Furthermore this connector assembly 50 provides a sturdy connection as well as providing a means for forming tight fitting components, even though the manufacturing tolerances for the individual subassemblies may be quite large and would render conventional connector means unsuitable for fabricating an assembly of good quality and reliability. There are a number of practical considerations that limit the precision with which furniture using wood frame members can be built. The most common material used to fabricate upholstered furniture frame members is plywood, and the thickness of plywood can vary. Therefore it may be difficult, and more costly, to insure that the same thickness is always used for the same item of upholstered furniture. Plywood or other wood products can also be warped or twisted. Variations in the moisture content of wood can also result in expansion or contraction of the wood, especially if solid wood is used. The moisture content can be especially difficult to control during shipping, especially during shipping in marine containers, which may be subject to high humidity and temperature, and the unassembled furniture components can be shipped in many different climates.

Connector assembly 50 comprises a female connection in the form of a keyhole slot 60 and a male fastener assembly 70, that fits with the keyhole slot 60. Details of the male fastener assembly 70 are depicted in FIGS. 3 and 4. One component of this male fastener assembly 70 is a sleeve 80 that is shown in FIGS. 5A and 5B. The primary load bearing member of the male fastener assembly 70 is a threaded fastener member or bolt 71. Fastening means other than threads can also be employed, but one advantage of using a metal bolt 71 of the type depicted herein is that such bolts are commonly available and relatively inexpensive. In the preferred embodiment, the bolt 71 includes a head 72 at one end and a threaded section 74 that extends to the other bolt end 75. FIG. 4 shows a bolt 71 with threads extending along its entire length, but in most applications only a short threaded section adjacent the bolt end 75 opposite from the head 72 is needed. These threads 74 will only engage a threaded surface on a female member, such as a T-nut 92, that is anchored to a frame member, such as arm sidewall 21A shown in FIG. 4. A bolt 71 with a standard head 72 is not essential. A screw or bolt having a screw head could be substituted. However a bolt 71 with a protruding head 72 is well suited for use in this application, because the head 72 can be gripped by a wrench, and a user will have a large lever arm to tighten the bolt 71 in nut 92. It is highly desirable that the bolt 71 or other cylindrical male fastener be tightly attached to a frame member, because the bolt 71 will be employed not only to attach the two components, but also to tighten one component relative to another to form a tight connection even in the presence of relatively large manufacturing tolerances. This tight connection will be formed with a keyhole slot 60 located in a mating subassembly.

In the preferred embodiment depicted herein, the bolt or other cylindrical fastener member 71 will not directly engage the keyhole slot 60. Sleeve 80 is symmetrical a central axis of rotation. A sleeve 80, having a conical surface 84 will engage tapered surfaces 64 on the keyhole slot 60, and a cylindrical shank portion 83, adjacent the conical portion 84 will either engage or be positioned in close proximity to a bearing surface 61 in the relatively narrow slot 63 formed in the keyhole slot configuration 60. Sleeve 80 will serve as a spacer member, a support member and a gripping or tightening member. Sleeve 80 will preferably comprise a one-piece molded plastic member. However, the sleeve 80 can be formed by multiple components or it can be fabricated from a metal or some material other than plastics suitable for molding.

The sleeve 80 has a cylindrical hole 81 extending between opposite sleeve end faces 86 and 87. The diameter of this hole 81 is sufficient for bolt 71 to be inserted completely through the sleeve 80, but leave sufficient clearance so that sleeve 80 is free to rotate around the bolt 71 and not bind itself on the bolt. Sleeve 80 is thus free to move axially relative to the bolt 71. The diameter of the bolt head 72 is, however, larger than the diameter of hole 81 so that bolt head 72 will abut the conical sleeve end face 86. Washers 91 can also be positioned between the bolt head and the sleeve end face 86. The cylindrical sleeve shank section 83 has a sufficient outer diameter so that the sleeve will abut the periphery of a hole drilled into a frame member on which the male fastener assembly 70 is mounted. Metal washers 91 can also be provided adjacent shank end face 87. In addition, compressible washers 90 can also be positioned between sleeve 80 and a frame member. In the preferred embodiment depicted herein, compressible washers 90 can be fabricated from a rubber or elastomeric material, and these compressible washers 90 can comprise one-piece molded members. Alternatively a flexible compressive spring member, such as a split washer or a Belleville washer could also be employed as a compressible washer. In FIGS. 3 and 4, the male fastener assembly 70 is shown attached to an arm frame side wall 21A. A single compressible washer 90 and a single metal washer 91 surround the bolt 71 and are positioned between the sleeve 80 and frame member 21A. Edges of upholstery layer 26 are also trapped between the metal washer 91 and the sofa arm frame side wall 21A so that the sleeve 80 can be pressed against the upholstery and will not disturb the configuration of the upholstery. A slit or hole may be provided in the upholstery so that the bolt 91 can be inserted through the upholstery layer 26 that has been previously affixed to the frame wall 21A.

The male fastener assembly 70 will engage keyhole slot 60 in order to attach two components or subassemblies together. This keyhole slot 60 is shown in FIGS. 6 and 7A-7D and the engagement of the male fastener assembly 70 to a keyhole slot 60 is shown in FIGS. 8A through 8D. In the preferred embodiment of this invention, the keyhole slot is formed in wooden frame members in components or subassemblies that will be attached to other components or subassemblies in an upholstered furniture item, such as sofa 2. FIGS. 6 and 7A-7D show one keyhole slot 60 that is formed in one of the back frame posts 31 in the sofa back 14 to which the sofa arms 10 will be attached by the connectors 50. The keyhole slot 60 is formed by routing or otherwise cutting the wooden frame post 31 with a router or other tool, and can be efficiently formed using conventional CNC equipment. Keyhole slot 60 includes a generally circular entry or alignment hole 62, defined by an inner surface 65 as shown in FIG. 6, with a narrower slot 63 extending generally radially from one end of the hole 62. Slot 63 includes bearing surfaces 61 opposite sides of slot 63. These bearing surfaces 61 are generally parallel in this representative embodiment and are spaced apart by a distance sufficient to receive the cylindrical shank portion 83 of sleeve 80. Note that the outer diameter of the sleeve shank 83 is greater than the outer diameter of the bolt 71, so the sleeve 80 will abut the bearing surface 61 and loads and pressure applied to the wooden frame will not be as concentrated as if engaged directly by a bolt 71. The diameter of the alignment hole 62 is sufficient for insertion of the conical section 84 of sleeve 80 at its widest diameter as defined by ring 85. The sleeve 80 can thus be inserted through the generally circular hole 62 and when the sleeve 80 is inserted to a sufficient depth relative to keyhole slot 60, the sleeve shank portion 83 can be moved into the narrower slot 63. In this position, the sleeve 80, and the male connector assembly 70 of which it is a part cannot be moved along the axis of the bolt 70 and the entire male connector assembly 70 out of engagement with the keyhole slot 60. The connector assembly 50, of which keyhole slot 60 and male connector assembly 70 are cooperating parts will thus connect and lock a subassembly containing a frame component, such as back frame post 31, to another frame component, such as inside arm rail 21A so that the connector 50 can lock a sofa arm 10 on one end of the sofa back 14.

Figures 7A, 7B:
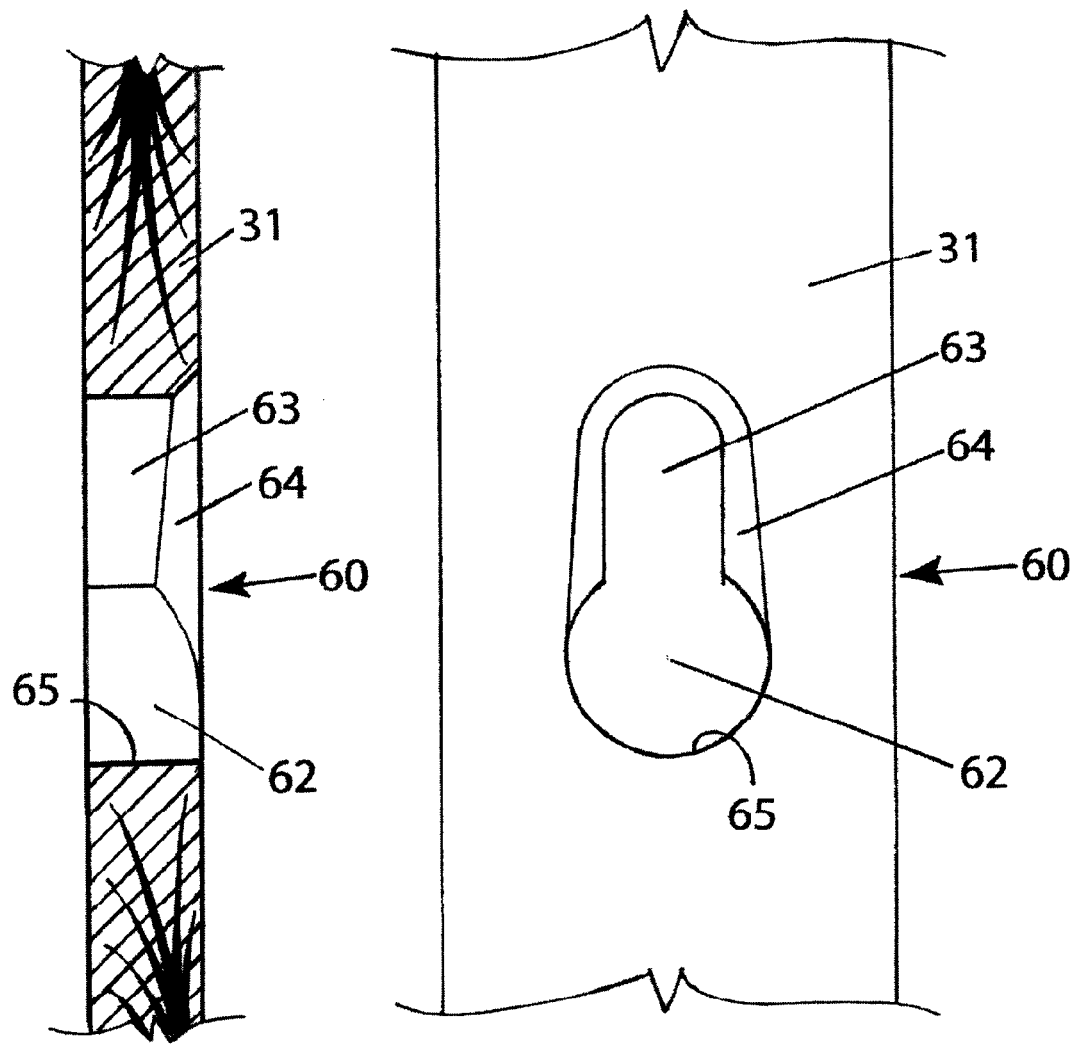
FIG. 7A is a section view of a keyhole slot such as that shown in FIG. 6, showing a beveled edge of the keyhole slot.
FIG. 7B is a partial elevational view of the keyhole slot of FIG. 6.
Figure 7C:
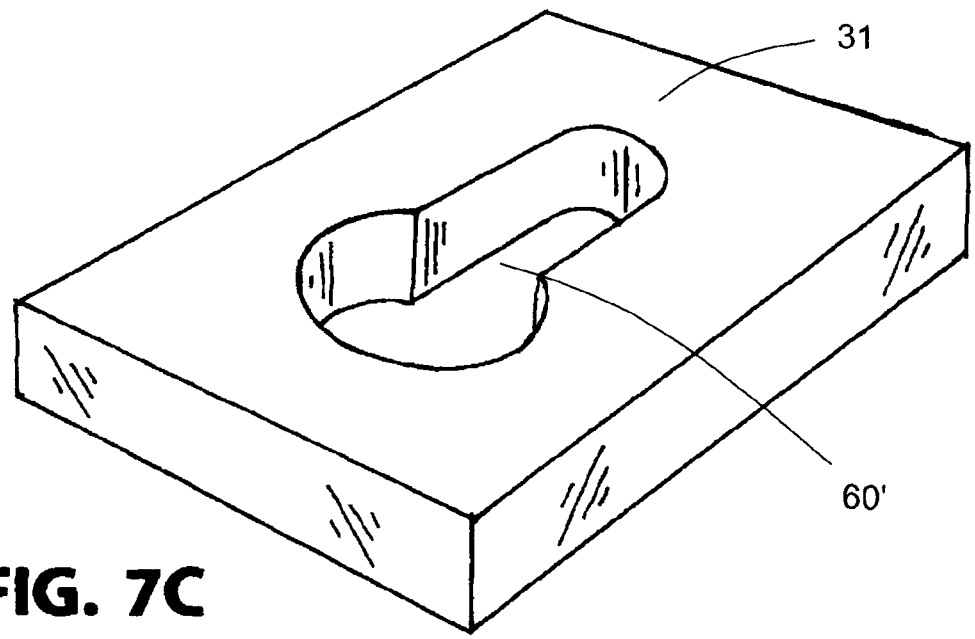
FIG. 7C is a view showing the first step if cutting the keyhole slot in a wooden frame member and FIG. 7D shows the keyhole slot after routing the slot shown in FIG. 7C to form beveled edges on one portion of the keyhole slot.
Figure 7D:
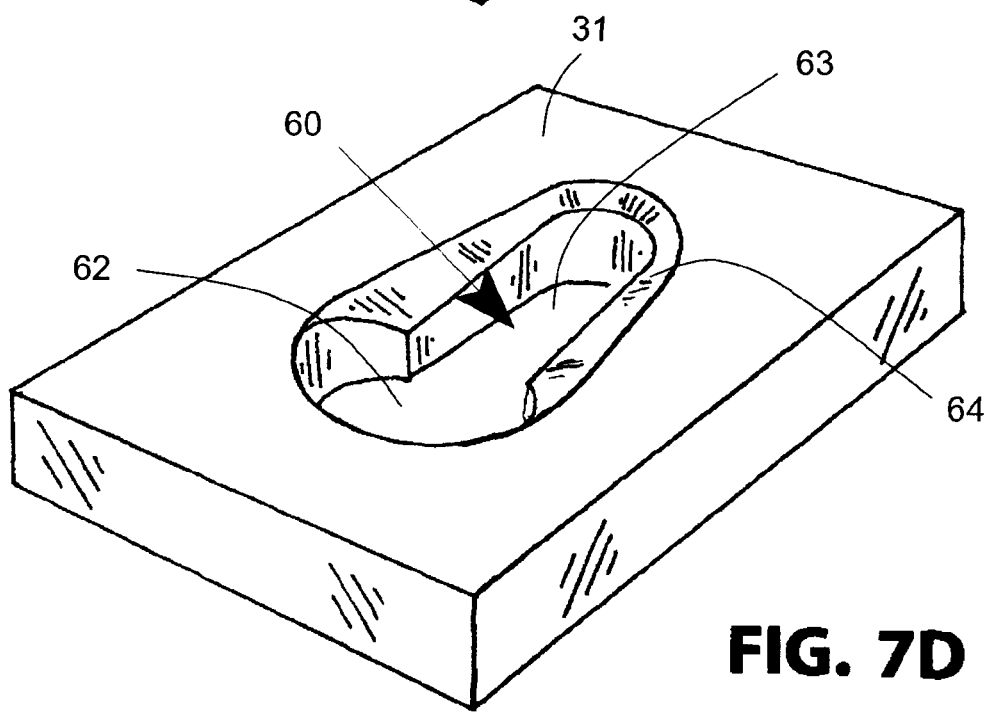

A tapered or beveled surface 64 is formed along the inside edge of the bearing surface 61 of slot 63. This beveled surface 64 can be formed by a router. The router would move transversely relative to the plane of the wooden member as the beveled surface 64 is being formed so that the depth of the beveled surface 64 changes. In addition to being tapered relative to the bearing surface 61, FIG. 7A shows that the depth of the beveled surface 64 is greater adjacent the intersection between slot 63 and hole 62 than at the apex or top of slot 63. This inclination between the hole 62 and the apex of slot 63 can be formed by a router that moves transversely relative to the planar faces of a member, such as back frame post 31 as the slot 63 is being formed. When the sleeve 80 moves into slot 63, the conical sleeve surface 84 will engage the slot beveled surface 64 and this will cause the sleeve 80 to move along its axis of revolution and along the axis of revolution of the bolt 71 so that the frame members being connected, will move toward each other. This movement of the two frame members toward each other results because the slot beveled surface 64 is located on the inside surface of the frame member. When employed to attach an arm frame member 21A to a back frame member 31, this will tighten the engagement of the sofa arm 10 to the sofa back 14.

The typical thickness of the plywood that would normally be used to fabricate a frame would be three-fourths (¾) of an inch or approximately 25 mm. Normally, the sleeve 80 would be dimensioned so that the distance between the sleeve shank end face 87 and the intersection of the conical surface 84 and the sleeve outer ring surface 85 would be equal to three-eights (⅜) of an inch, or equal to one half of the nominal thickness of the plywood with which the sleeve 80 is to be used. The outer diameter of the ring section 85 can be 31.5 mm and the outer diameter of the shank 83 can be 21.5 mm, while the angle or taper of the conical surface 84 can be forty-five (45) degrees relative to the axis of the sleeve hole 81. The preferred embodiment of sleeve 80 would be employed with a standard ⅝ inch bolt. Of course these dimensions are representative and other dimensions could be employed for this embodiment as well as for other versions.

In spite of the tolerances inherent in either furniture manufacturing and/or wood working, a stiff, tight connection between furniture components or subassemblies can be achieved by using the connector assembly 50, and of course use this connector assembly is not limited to furniture assembly, since the same basic configuration can be employed with other devices. The connector assembly 50 can also be used with either upholstered or non-upholstered furniture items, although it has special advantages when used with knockdown or field assembled and disassembled upholstery furniture items.

Although the engagement of the conical sleeve surface 84 with the tapered keyhole slot surface 64 will promote a tight fit between components, washers can be employed to remove excess spacing during assembly so that a tight fit is always possible. Standard metal washers 91 can be employed to take up space. The addition of washers 91 will also permit use of the other male connector components to connect components having different nominal dimensions. For example the thickness of upholstery layers can be different for different furniture designs, but standard male fastener components can be used for different designs merely with the addition or subtraction of standard metal washers. Compressible washers 90 provide additional means for maintaining a tight fit between mated components. The compressible washers 90 can be employed in combination with the conical sleeve surfaces 84 and/or the beveled slot surfaces 64 to account for dimensional differences. As the connection becomes tighter when the conical sleeve surface 84 moves along beveled slot surface 64, a compressible washer 91 can be employed to take up even more slack. Alternatively the beveled slot surface 64 may be eliminated, and a compressible washer 91 can account for all of the slack in some situations. These combinations will also allow the sleeve 80 to fully enter the slot section 63 so that the sleeve shank 83 will engage the apex of slot section 63. Thus the two interconnected components, such as sofa arm 10 and sofa back 14 will be in proper vertical alignment when these components are tightly fit together.

The connector assembly of this invention is a simple reliable solution for a blind connector that does not require tight tolerances in the manufacture of its components. In fact except for a resinous or nonmetallic sleeve, the parts are common off the shelf items. The manner in which the beveled keyhole of this invention works with the male connector requires only one important tight tolerance, which is the length of the male connector relative to the beveled surface on the female keyhole slot. This has been achieved by the ability to adjust the length of the male connector. The length of the male connector can be extended or shortened by 1/16th" increments by adding or removing standard washers. Employing compressible washers enables the adjustments to be measured in thousands of inches by either tightening or loosing the connecting bolt of the male connector. This is what allows for compensating the varying and sometimes large tolerances on upholstered items. Trial fitting and adjustments can easily be made at any time. If washers are lost or extra washers are needed, they can easily be purchased at most local hardware or home improvement stores.

Figures 8A, 8B:
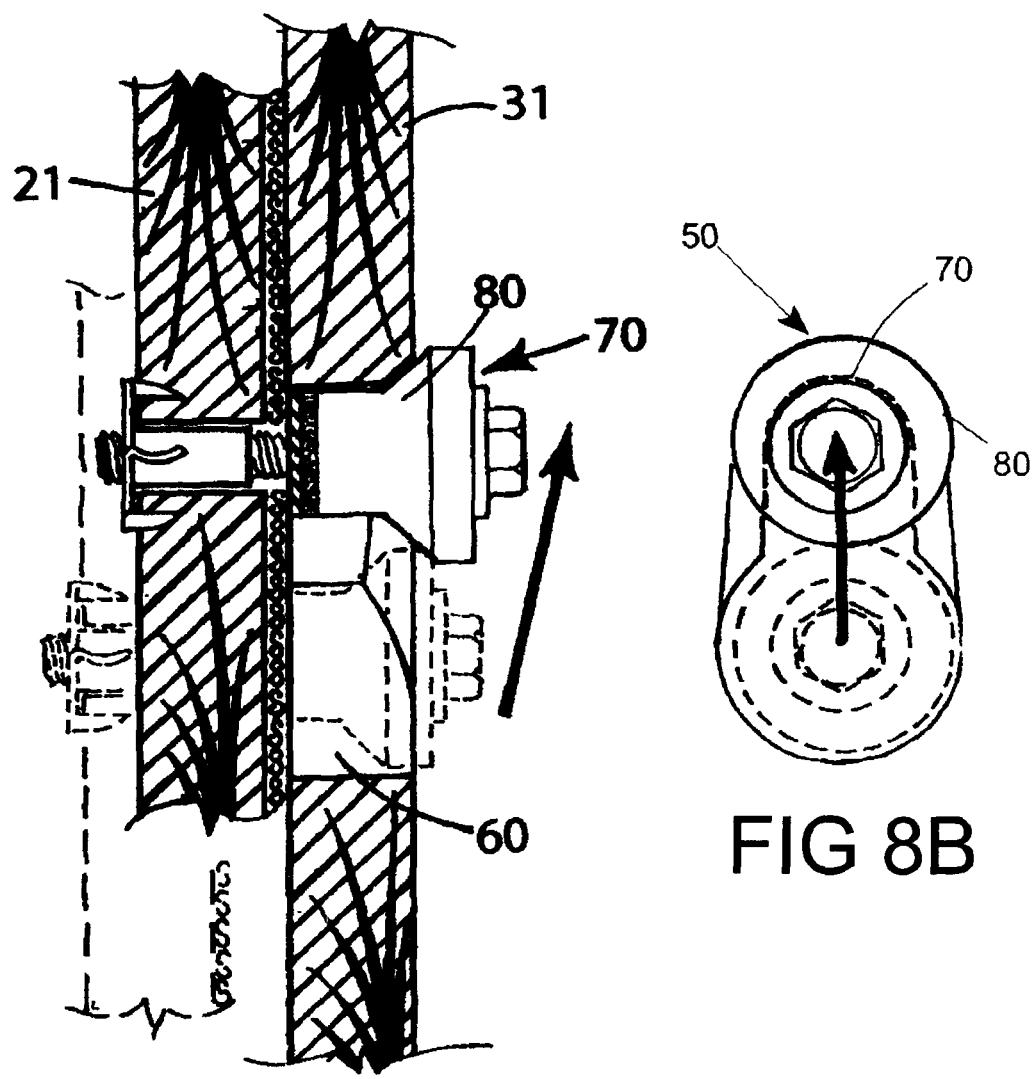
FIG. 8A is a side sectional views showing the manner in which the male connector or fastener is inserted into the keyhole slot to attach two furniture components.
FIG. 8B shows movement of the male connector member in the keyhole slot.
Figure 8C:
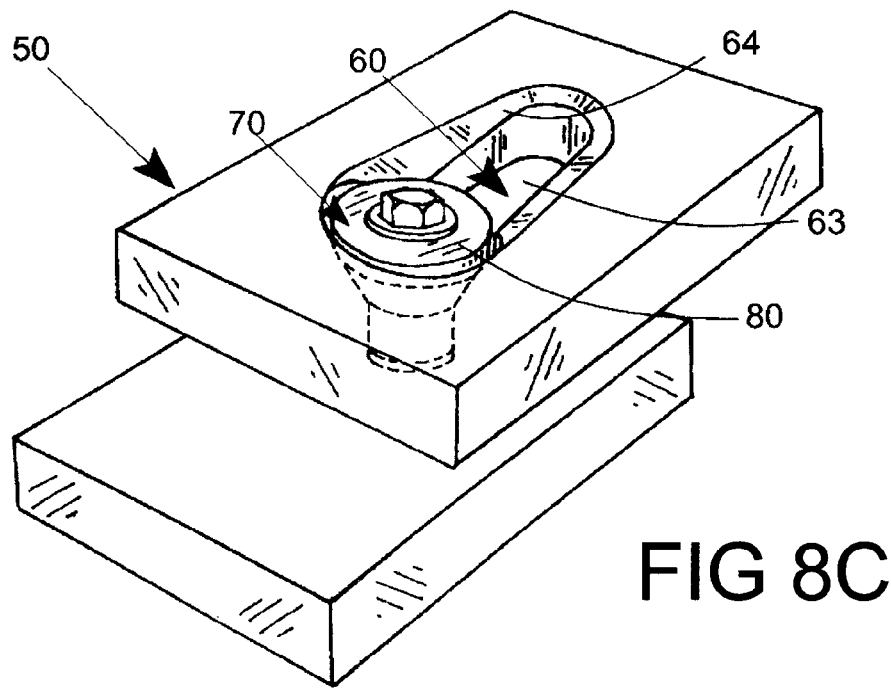
FIG. 8C shows the male connector as it is initially inserted into an alignment section of the keyhole slot and FIG. 8D shows the manner in which the connector moves two frame members into a tight fit.
Figure 8D:
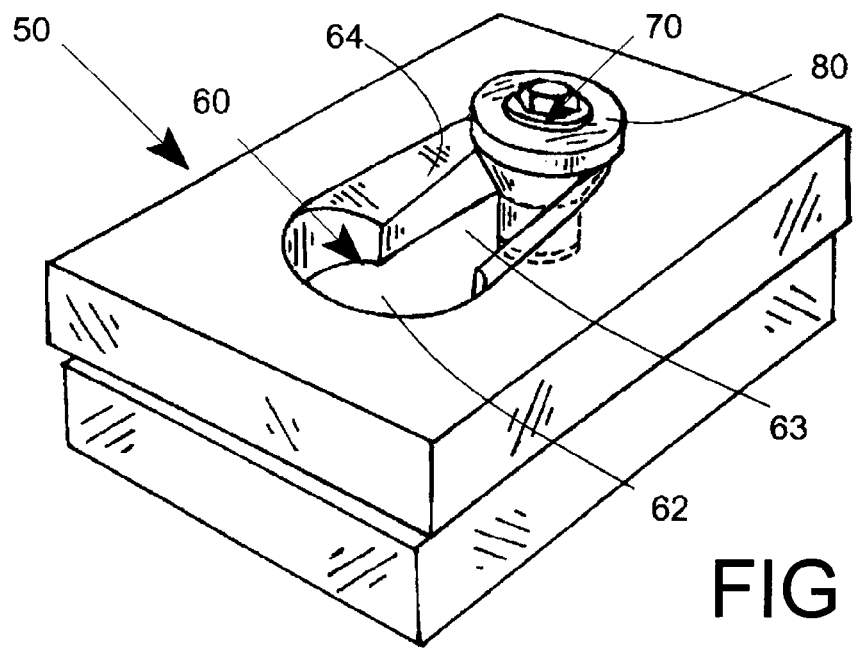
Figure 9A:
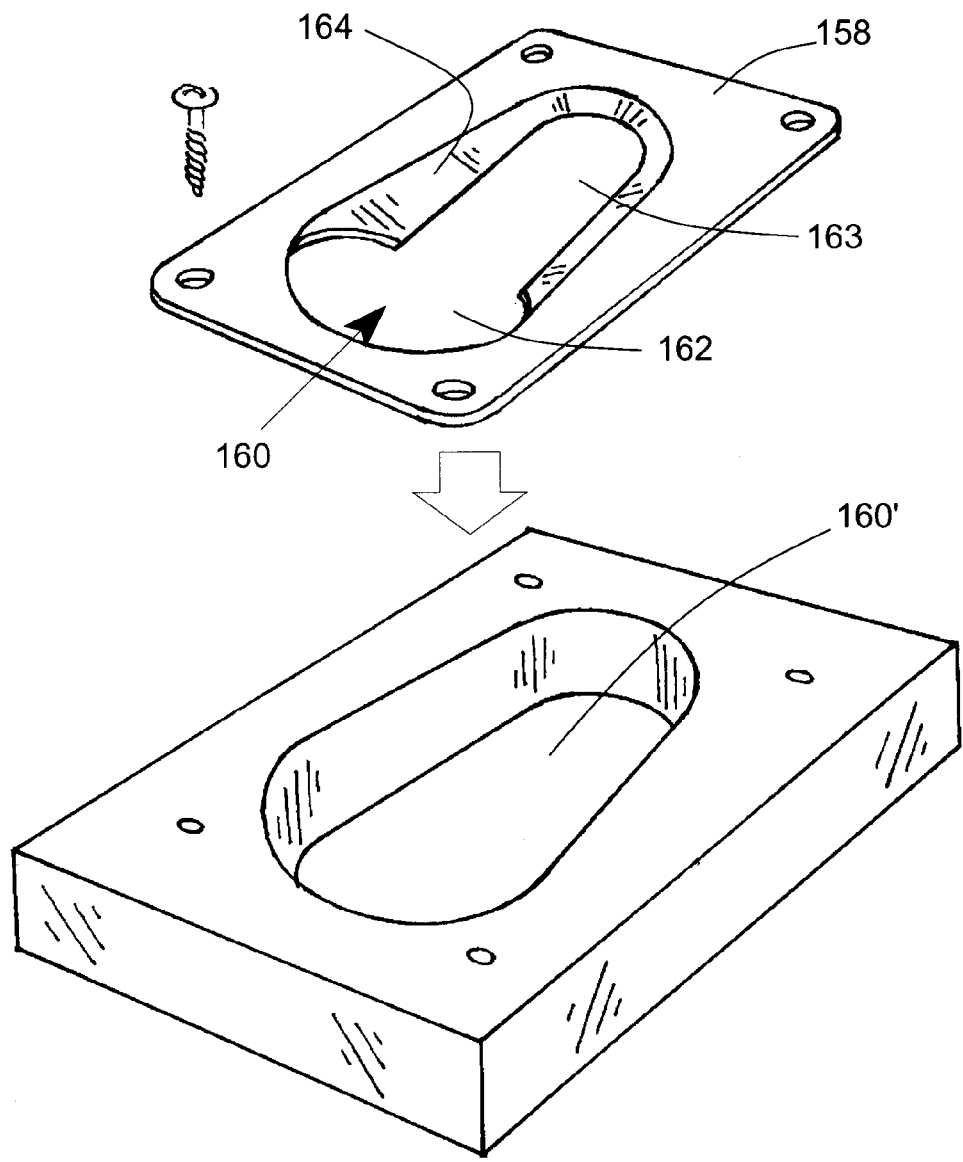
FIGS. 9A through 9D show an alternative version of a keyhole slot that can be formed in a metal or plastic fitting or other nonwooden material and will function in the same manner as the keyhole slot shown in FIGS. 6 and 7 and in the operational views 8A through 8D
Figure 9D:
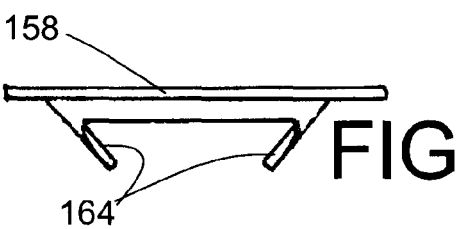
Figure 9B:
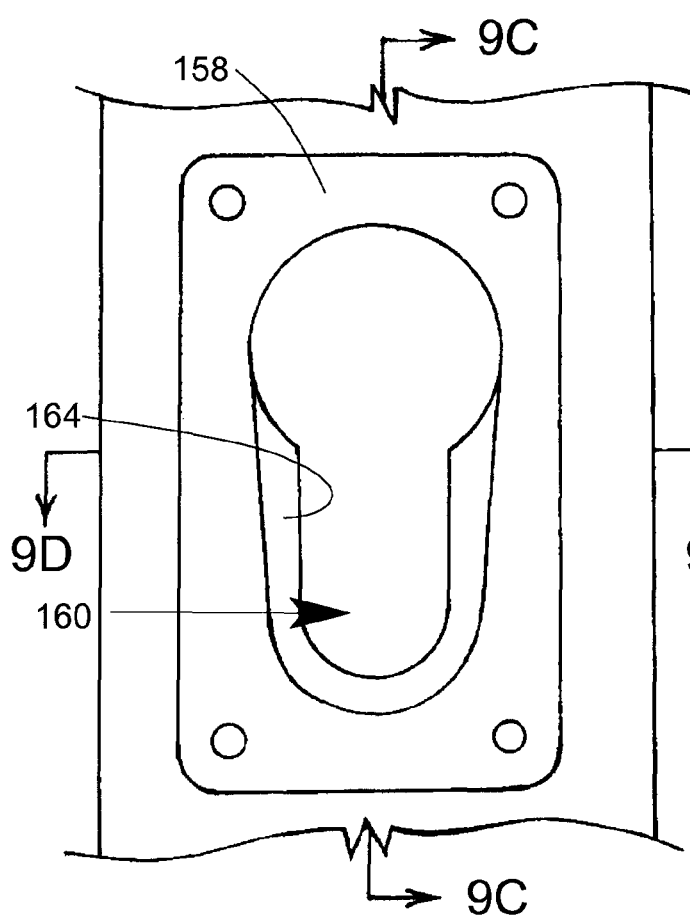
Figure 9C:
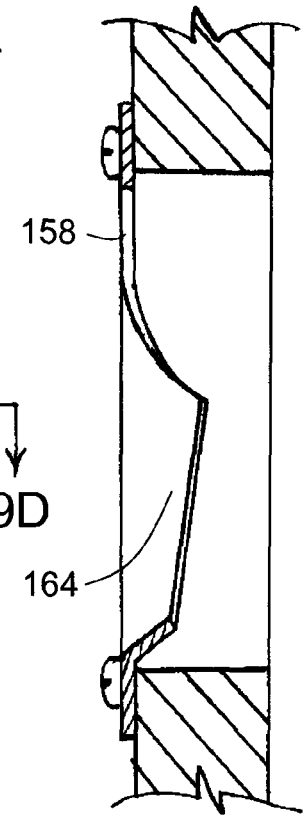

FIG. 8A is a side sectional view showing the manner in which the male connector or fastener is inserted into the keyhole slot to attach two furniture components. FIG. 8B shows movement of the male connector member in the keyhole slot. FIG. 8C shows the male connector as it is initially inserted into an alignment section of the keyhole slot and FIG. 8D shows the manner in which the connector moves two frame members into a tight fit. In these figures, an arrow shows the movement of the male connector 70 relative to the keyhole slot 60 when the furniture components are assembled. As clearly shown in FIG. 8A, the male connector 70 not only moves parallel to the keyhole slot 70, but also transverse relative to the frame member in which the keyhole slot 60 is formed, so that the two frame members and the two furniture components will we wedged into a tight fit.

An alternative keyhole slot configuration is shown in FIG. 9A through FIG. 9D, which show a metal keyhole slot fitting 160 that can be attached to an oval or elongate opening 160' in a frame member. This alternative keyhole slot configuration will function in the same manner as keyhole slot 60 and will engage the male connector assembly 70 and the sleeve 80 in the substantially the same manner. The circular alignment or entry hole 162 is large enough for insertion of sleeve 80 and the sleeve shank 83 will fit within slot 163. The sides adjacent the slot 163 will be formed inwardly by a punch so that a beveled or inclined edge 164 will be formed. The conical sleeve surface 84 will engage this formed edge 164 in the same manner in which it would engage the routed beveled surface 64. The keyhole slot 160 is one alternative to the keyhole slot 60, but it is by no means the only option. For example, the sleeve 80 can be fabricated as part of the bolt so that a conical surface would be formed on the bolt itself. Other modifications could be made, but the representative versions depicted herein demonstrate the manner in which the assembly and disassembly of items, such as knockdown furniture items can be improved.

Figure 10A:
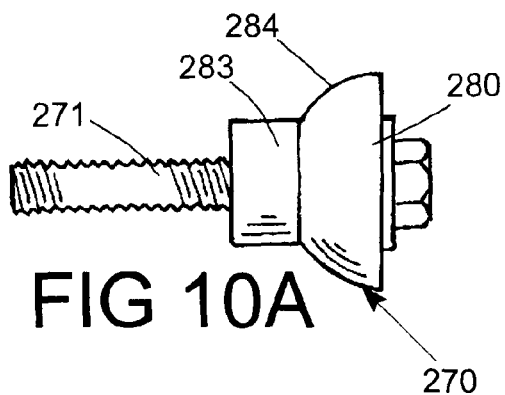
FIGS. 10A and 10B show and alternate version of the male connector with a sleeve having a convex curved surface between the shank and the end of the sleeve.
Figure 10B:
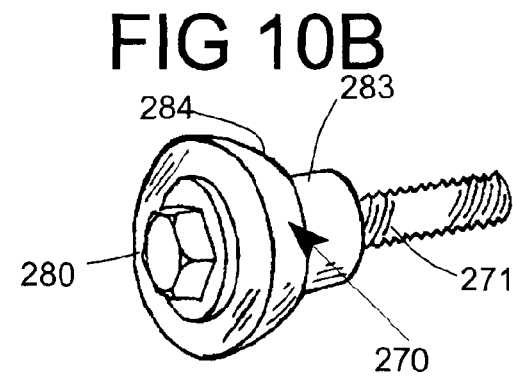
Figure 11A:
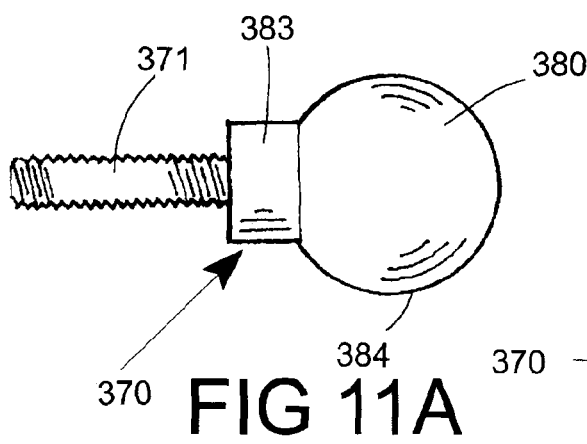
FIGS. 11A and 11B show another alternate version of the male connector in which the larger portion of the sleeve has a spherical shape.
Figure 11B:
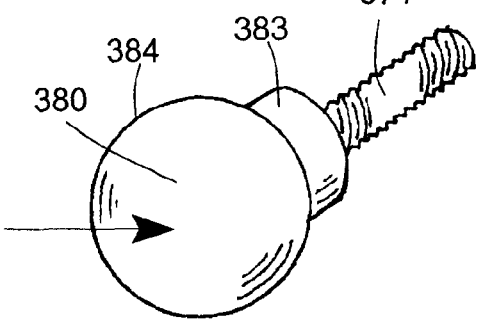
Figure 12A:
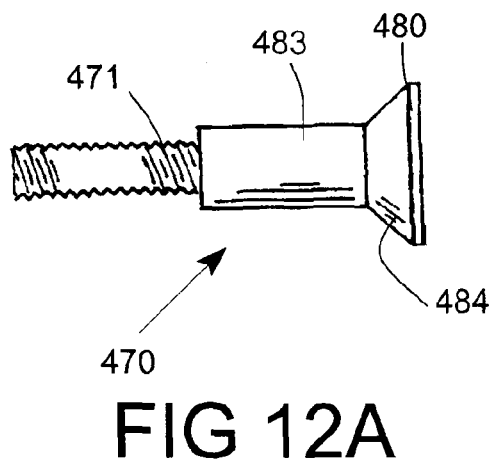
FIGS. 12A and 12B show another version of the male connector that can be machined so that the enlarged sleeve section and the threaded section are part of the same one-piece member.
Figure 12B:
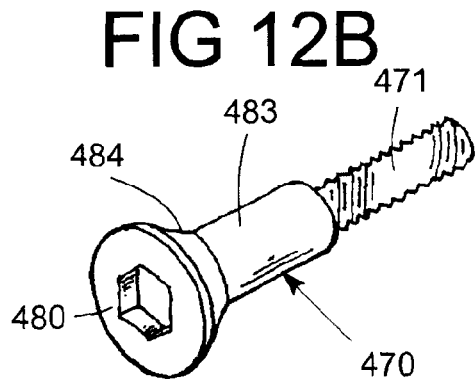

Another alternate embodiment of the male connector is shown in FIGS. 10A through 10B in which a sleeve 280 has a convex curved enlarged section 284 extending from shank 283 with the threaded shaft 271 of the bolt extending therebeyond. This embodiment operates in substantially the same way as the earlier embodiment. FIGS. 11A and 11B show another version in which the sleeve 380 has a spherical enlarged section 384 and a cylindrical shank 383 with the threaded shaft 371 extending to the opposite end. This version can be formed by either inserting the spherical sleeve 380 onto the bolt or by insert molding the sleeve 380 on the bolt. FIGS. 12A and 12B show a version in which the sleeve comprises a conical section 484 and a cylindrical shank 483. The entire connector 470, including the threaded shaft 471 can be machined from the same material, such as a metal blank to form a one-piece metal connector 470.

Figure 13A:
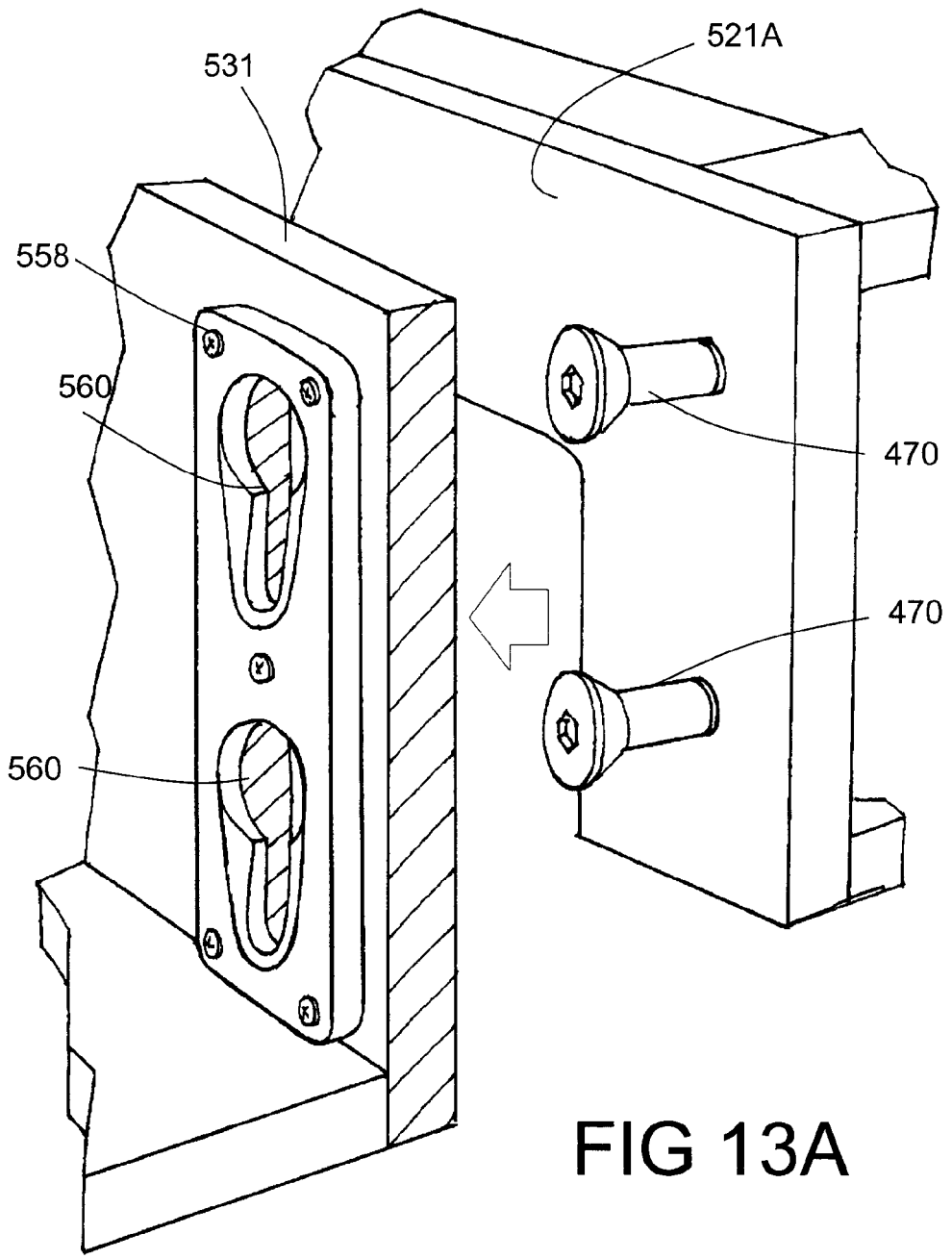

FIGS. 13A through 13C show still another version in which two keyhole slots 560 are formed in a plate 558 that is screwed to one frame member 531. A male connector, such as threaded connector 470, shown in FIGS. 12A and 12B can be attached to another frame member 521A, and the two frame members can be assembled in the same manner as previously discussed. As shown in FIG. 13C, the plate 558 can be formed from a plastic or other resinous member and the use of two keyhole slots 560, each with beveled surfaces 564, will provide additional strength, which can be of significant importance when molding the plate 558 and the keyhole slot 560 from a plastic.

An important aspect of this connector assembly 50 is that all of the connector components will be hidden when the furniture components are fully assembled. The male connector assembly 70 will fit within a keyhole slot 60 located in an internal frame member that is covered by the upholstery or outer covering of the item of furniture. The sleeve 80 protrudes only in the unassembled configuration. During assembly, the sleeve 80 can be inserted through a slit or opening covering the keyhole slot 60 and will be easy to align with the circular entry hole 62 in keyhole slot 60. Since the sleeve 80 can be molded from plastic and will be larger in diameter than a standard bolt and have no rough edges, there will be little chance that the sleeve 80 will snag or tear the upholstery. Even in designs in which the frame posts 31 may be exposed before assembly, as shown in FIG. 1, the connector assembly 50 will hold two components in abutting relationship so that the previously exposed frame as well as the connector need not be visible in the final assembly.

Although the connector assembly 50 and alternative versions thereof improve the attachment of one furniture component to another, the capability of firmly assembling furniture components in the field to form items of furniture having feel and function equivalent to similar items manufactured in a factory, offers further advantages. A field assembly or a knockdown capability has economic advantages, if components can be efficiently shipped. Inventive items of furniture employing the connector subassembly 50 or similar fastening means permit shipment of the furniture components in a smaller space than a fully assembled sofa or similar furniture item.

Figure 14A:
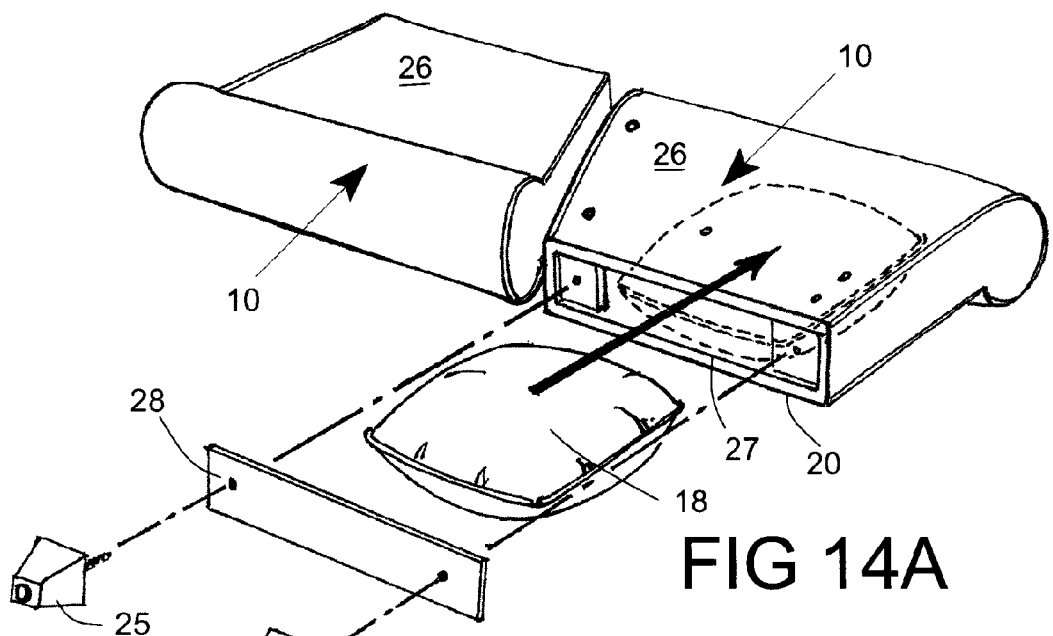
FIG. 14A is a view showing the manner in which sofa arms comprise storage in which pillows or cushions can be placed for shipment and FIG. 14B shows the manner in which pillows or cushions can be stored within the sofa back for shipment.
Figure 14B:
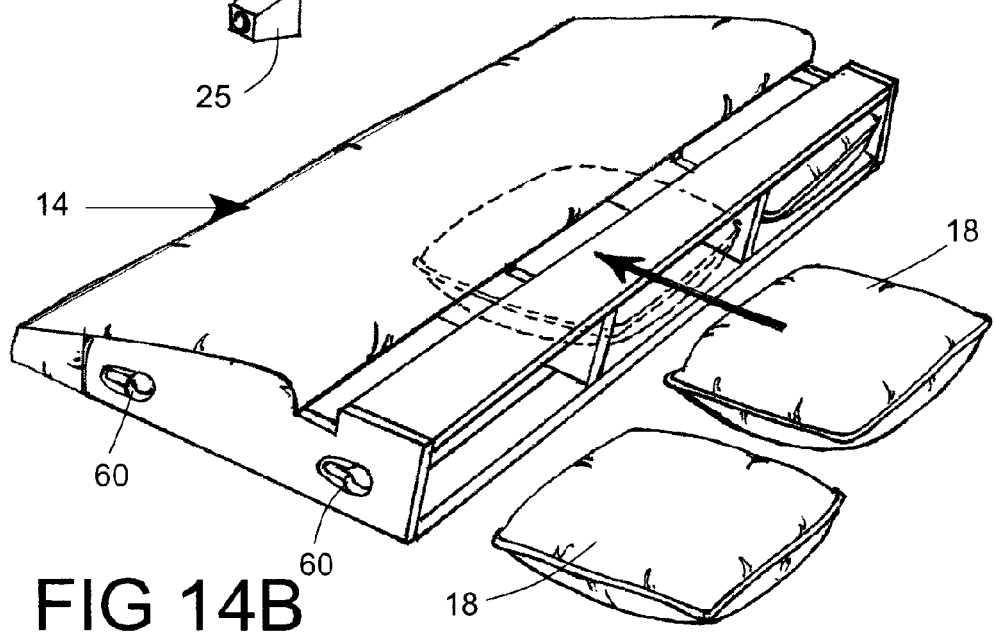

FIGS. 14A and B and 15 show some of the significant space savings that can be achieved by employing the instant invention. FIG. 14A shows two spacing saving features. First two sofa arms 10, each of which are wider at the top than at the bottom can be positioned end to end with inclined or tapered edges in abutment. Thus a knockdown or modular sofa need not be limited to versions having rectangular arms. The tapered sofa arms 10 are especially suited for storage in small volumes, because the tapered sofa arms can be stacked edge to edge with significant spacing savings. More conventional sofa arms with vertical rear edges extending to the top edge of an inclined sofa back will be larger and will be more difficult to ship in a smaller package. Perhaps more significant is that space for interior storage compartments 27 is available in the arms 10. In the embodiment shown in FIG. 10, the bottom rail 24 can either be detachable from or merely loosely bound to provide access to the interior storage compartment 27, which can provide storage shipment space for sofa pillows 18, which if necessary can be compressed to a degree sufficient to reside in interior storage compartment 27.

FIG. 15 shows that the various components of a representative sofa 2 can be stacked for shipment. The deck 12 has an open storage compartment 47 in which sofa back cushions 16 can be fitted for shipment. Sofa seat cushions 17 have approximately the same dimensions as the sofa back 14. Thus the various components of a knockdown or modular sofa can be stacked as shown in FIG. 15. All of these components or subassemblies can be packaged in one or multiple boxes that can be stacked together or the components can be bound by shrinkwrap or by using other conventional shipping accessories. The items forming the male fastener assembly 70 can be shipped as a kit along with other fasteners, or the male fastener assembly may be preassembled for shipment as shown in FIG. 2. If the male fastener assembly 20 is shipped in kit form, a sufficient amount of loose piece accessory items, such as washers 90 and 91, may be included so that there will be adequate accessory items so that even items of furniture having the largest dimensional tolerances or tolerance stack ups can be properly assembled. Other accessory items, such as screws or bolts for completing the assembly of the sofa arms 10 to the sofa deck 12 can also be included in kit form. The choice of preassembling the male connectors or of shipping them in kit form can of course depend upon the requirement of a specific type of furniture item. Space savings for shipment would apply not only to land or air shipment in the chain of distribution, but also to shipment in standard marine storage containers. The preferred embodiment of an upholstered sofa 2 can be packaged and shipped so that a total of sixty three (63) sofas 2 can be shipped in a standard marine storage container having a storage volume of 2,705 cubic feet with a height of one hundred two (102) inches, a depth of ninety (90) inches and a length of four hundred fifty (450) inches. A box containing a single sofa can have the dimensions of thirty (30) by thirty (30) by seventy two (72) inches. This represents a significant improvement over the number of fully assembled sofas that may be shipped in a marine container of the same size. A container of the same size could accommodate only thirty (30) sofa of the same size and style sofa built with a standard one piece frame.

The components can be stacked in the manner shown in FIG. 15 and packaged in one or two boxes. When packaged in this manner, these furniture items can be shipped by truck or rail as well as in marine containers. A sofa 2 can then be shipped from a distributor directly to a purchaser or it can be shipped to a retailer. The sofa components can then be assembled either by an experienced installer or by the purchaser, and the components need not be removed from their shipping package or packages until they reach the purchasers residence. The relatively small packages enhance the portability of the knockdown or ready to assemble components. The male fastener assemblies 70 can either be attached to components, such as sofa arms 10, prior to packaging or they can be shipped in kit form, where they can be assembled to the proper furniture component on site.

The representative embodiment of sofa 2 requires only the following assembly steps. First components, such as pillows 16 and 18 are removed, and if necessary the feet 25 and lower plates 24 are assembled to the arms 10. If the male connectors 70 were not assembled prior to shipment, a sleeve 80 can be inserted on bolt 71, and, if necessary a compressible washer 90 and one or more standard washers 91 can be inserted over each bolt 71. The male fastener assembly 70 is then mounted on an appropriate component by screwing the bolt 71 into the T-nut 92. This can be done from the outside. Since the upholstery layers 26, 36 and 46, as well as any foam, are on the exterior of the boxes formed by the component frames, there will be no interference with these layers when the bolt 71 is secured to nut 92. There is no need to access the interior of the component, such as sofa arm 10 to mount the male fastener assembly 70. Normally the bolt 91 is tightened, and this can be done from the outside. If the sleeve 80 is not properly positioned, then standard washers 92 can be added or removed. Once the sleeves 80 have been properly positioned, the sofa arms 10 can then be assembled on each side of the sofa back 14.

The sofa arms 10 can be mounted on sofa back 14 one at a time. The two sleeves 80 projecting inwardly from the inwardly facing surface of arm 10 on a sofa are then aligned with the entry or alignment hole 62 on the corresponding keyhole slot 60. The keyhole slot 60 is accessible because the upholstery layer 46 either will not cover the keyhole slot 60 or an appropriate opening is provided. Each sleeve 80 can then be inserted into its corresponding keyhole slot 60. After the sleeves 80 on one arm extend through corresponding hole 62, the back 14 is pushed down relative to the arm 10. There will then be relative movement of the sleeve 80 laterally of its axis into the narrow keyhole slot section 63. Shank 83 thus enters the slot 63. The conical sleeve surface 84 will engage the tapered or beveled slot surface 64 as the sleeve 80 moves relative to the keyhole slot 60. This will result in a tight and sturdy connection of the arms 10 to the sofa back 14. Any exposed frame will be covered by preassembled upholstery layers 26 and 46, and these layers can be compressed to form a sturdy connection that will be free from squeaking. Since the sleeve 80 moves progressively into a tight fit, adjoining upholstery layers will not rub against each other under compression, both making the assembly step easier and also avoiding dislodgment, damage or protrusion of the previously assembled upholstery layers. Both arms 10 may be attached to sofa back 14 in this manner.

After the arms 10 are attached to the sofa back 14, the sofa deck 12 can then be assembled to complete field assembly of sofa 2. The back edge of the sofa deck 12 can be inserted into the birdsmouth slot 35 on sofa back 14, which will support the sofa deck 12 along its entire length. When weight is applied to sofa deck 12 by those seated on sofa 12, the sleeves 80 will be even more firmly seated in keyhole slots 60 to reinforce the assembly. The front rail 41 will provide support for the front of sofa deck 12. Conventional fasteners can the secure the opposite sides of sofa deck 12 to the arms 10. Since the bottom surface of sofa deck 12 is open, access to insert these fasteners will be simple. Conventional threaded fasteners can be screwed in place using a screwdriver or wrench. Alternatively fasteners with knob that can be gripped by an installer can be used. In this manner the primary components of sofa 12 can be assembled, either by an experienced technician or by a purchaser provided with relatively simple instructions. The sofa 2 can also be easily disassembled by reversing these steps and the sofa components can then be easily moved to a new location and reassembled. Even if the connector assembly 50 may no longer fit as well as when initially installed, the fit can be adjusted either by removing one or more of the conventional washers 91, or by adding new standard washers, which can be purchased from a hardware store if any washers that were initially supplied may have been lost.

Assembly of sofa 2 can be completed by an experienced installer in five to ten minutes. A person, without prior familiarity with such a sofa should be able to assemble sofa 2 in fifteen to twenty minutes. Such assembly is very easy and does not require a person to lift heavy loads. One person can assemble and disassemble sofa 2 because the individual components are not heavy and access to the interior to perform intricate operations or blind operations in not required.

A connector or fastener having the capabilities of connector assembly 50 needs to be provided, because some of the primary sofa components, such as arms 10 and deck 12 included open storage compartments. To provide a sturdy, high quality finished assembly, then the connection of hollow or open components needs to be tight and strong. In addition to providing open storage space, some of the components need to be open to provide clearance for attaching other fasteners, such as the use of screws to attach the arms 10 to the deck 12. Other accessory items requiring at least limited access may be included in other designs, so the connector assembly 50 of this invention is important for other potential reasons.

Figure 16A:
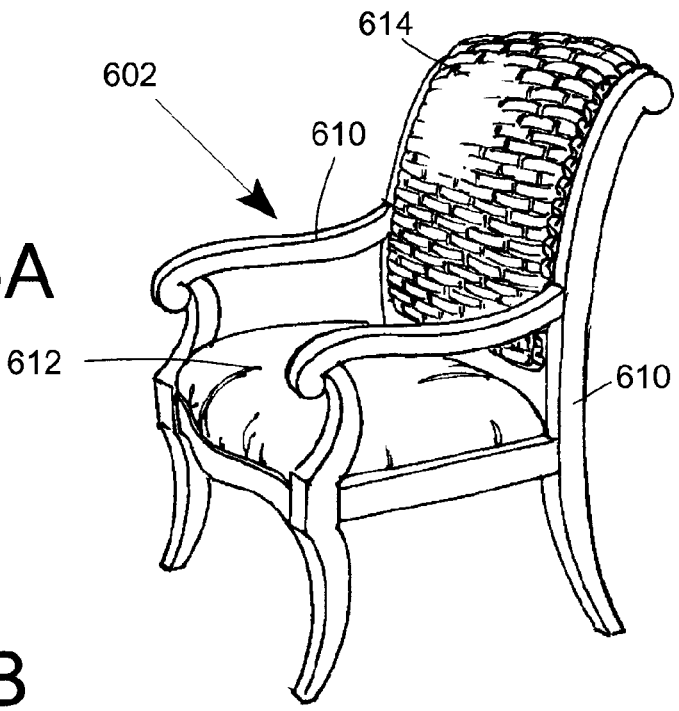
FIG. 16A Is a view of a chair fabricated using the connector members.
Figure 16B:
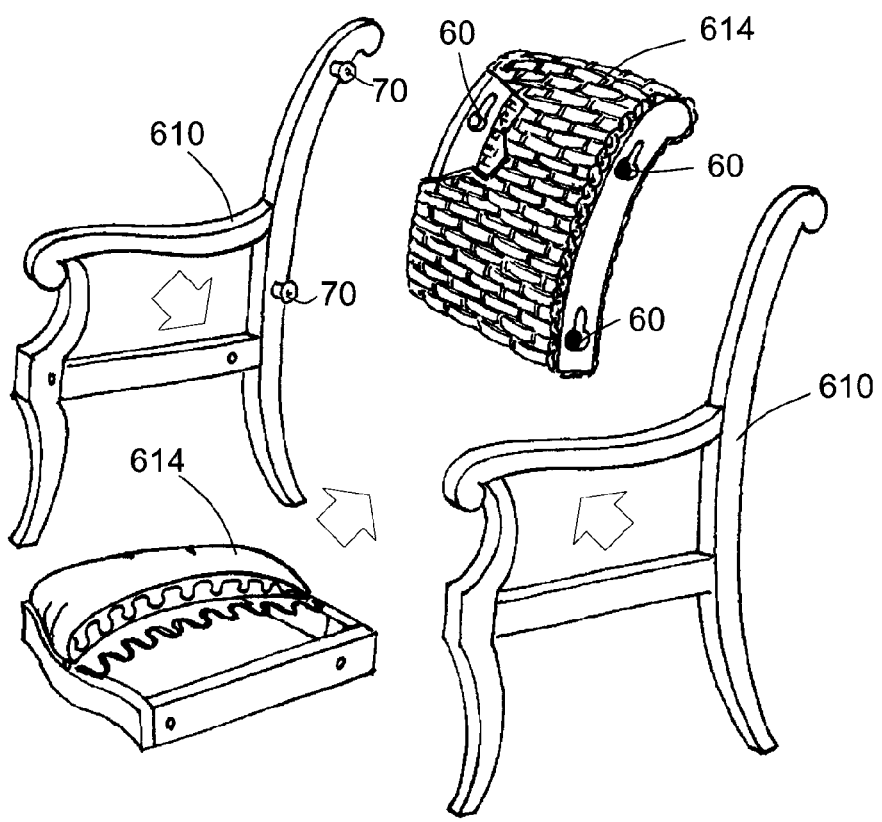
FIG. 16B is an exploded view, partially cutaway, of a chair fabricated in the same manner as the sofa of the first embodiment.

One of ordinary skill in the art would readily understand that the basic invention represented by the preferred embodiment of sofa 2 could be employed with other items of furniture. FIGS. 16A and 16B show a chair 602 that includes chair arms 610, a chair seat 612 and a chair back 614. A connector assembly including keyhole slots 60 and male connectors 70 identical to this used sofa 2 can be employed to assemble chair 202. FIGS. 16A and 16B also demonstrate how this type of connector can be used with exposed frame or wood members, such as arms 201 and the male connector 70 will still be invisible when the chair 202 is fully assembled.

Figure 17:
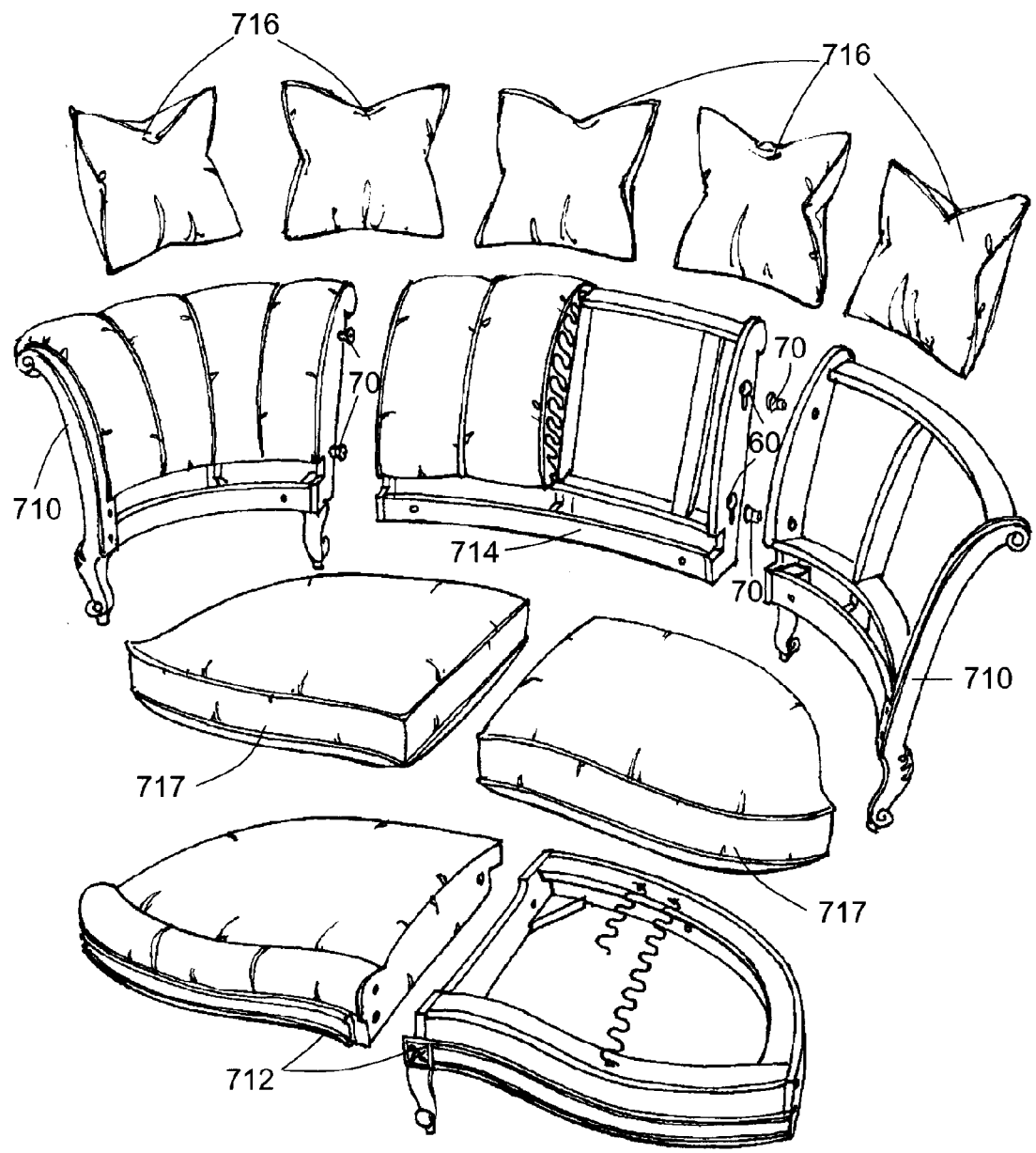
FIG. 17 is an exploded view, partially cutaway, of a curved sofa fabricated in the same manner as the sofa of the first embodiment, and showing the manner in which a sofa having a different style can still employ the connector assembly.

FIG. 17 shows an embodiment of a curved sofa, which can be assembled using the keyhole slots 60 and male connectors 70 in the previously described connector assembly 50. As shown in FIG. 17, these connectors are not limited to use on structures that mate at right angles, such as seat arms 710, one of which shows the normally covered frame of seat arm 712, to a seat back 714, a portion of which is shown so that the back frame is visible. FIG. 17 also demonstrates how connector assembly formed by male connectors 70 mating with keyhole slots 60 can be employed to connect other items, such as the two seat sections 712.

FIG. 18 shows a sofa 802 in which the arms 810 and the seat back 814 comprise thin members formed with an exposed wooden surface. The seat 812 is upholstered and cushions 816 and 817 can be added. The wooden sections 810 and 814 are relatively thin, but the blind connection of these components is still possible by using male connectors 70 insertable into keyhole slots 60. This version shows that the connector assembly is suitable for use when the frame members 810 and 814 are very thin, and are too thin to allow access to the connector assembly. For example, it would be very difficult, if not impossible to insert a fastener, such a bolt in the thin walls of the seat back 814 or to mount a connector in arm 810 after it was assembled in the factory. A blind connector of the type employed herein solves that problem. FIG. 18 also shows another manner in which the seat deck 812 can be affixed to the back 814 and to the arms 810. Ribs 835 and 838 extend from the inside surface of the arms 810 and the back 814 to support the deck 812 and allow fasteners to secure the sofa deck 812 to each of the ribs 835 and 838.

FIGS. 19A and 19B show the manner in which the connector assembly 50 comprising male connectors 70 and keyhole slots 60 can be used in a modular sofa 902. The connector assembly 50 can be used to interconnect multiple seat backs 914A-F, as well as connecting the sofa arms 910 to seat backs 914A and 914F. This embodiment demonstrates that the connector assembly is not limited to use with an item of furniture that can be assembled in only one configuration, because the modular components of sofa 902 can be assembled in a number of different configurations. In this embodiment, the seat decks 912A-E are connected using conventional fasteners, but the male connectors 70 and keyhole slots 60 can also be are incorporated into the seat components to connect the seat decks in FIGS. 20A and 20B. In addition to the orientation of the connectors and keyhole slots shown in FIG. 19B, one arm can include connectors and a second arm can include keyhole slots for field assembly of the arms to the seat back and the seat.

These examples show different items of furniture that can be assembled according to the principles of this invention and not fully inclusive. Other configurations can also be employed. For example, outdoor or rattan furniture can be assembled in this manner. Also as mentioned previously, use of the connector assembly is not limited to use with furniture. For example, the connector assembly could be employed to permit easy assembly or disassembly of a retail display rack or some other fitting in which the frame comprises the complete item. Other situations in which this connector assembly can be employed, and modifications of the connector apparatus will also be apparent to one of ordinary skill in the art. Other configurations could also be employed for the sleeve forming a part of the male connector assembly. For example instead of a conical section, a truncated spherical or ball configuration could be employed, and the keyhole slot surface with which it mates could be curved instead of beveled. Therefore the embodiments of this invention depicted herein are merely representative and the invention is instead defined by the following claims.

I claim:

1. An upholstered sofa shippable in pieces and suitable for field assembly, the sofa comprising:
   a sofa back;
   a pair of sofa arms;
   a sofa deck;
   connectors positionable between the sofa back and the sofa arms and comprising means for attaching the sofa arms to the sofa back, the connectors being covered by the sofa arms and the sofa back after assembly of the sofa arms to the sofa back;
   wherein the sofa deck is upholstered on front, top and sides thereof, but includes one or more open compartments dimensioned for storage of sofa components side by side in the open compartments for shipment, and wherein multiple keyhole slots are formed on each end of the sofa back, each keyhole slot having a beveled edge, and multiple connectors extend from the sofa arms, each connector being insertable into one corresponding keyhole slot in alignment therewith to assemble each sofa arm to the sofa back, wherein each connector includes a sleeve, and wherein a compressible washer abuts the sleeve, so that the combination of the beveled edge and the compressible washer permit play as the connectors are inserted into corresponding keyhole slots so that multiple connectors are insertable into multiple keyhole slots so that only movement of each sofa arm relative to the sofa back is required for assembly.

2. The upholstered sofa of claim 1, wherein the sofa deck includes a central frame member dividing the open compartment means into two side by side compartments for receiving the sofa components for shipment.

3. The upholstered sofa of claim 1 wherein keyhole slots are formed along opposite ends of the sofa back, the connectors being insertable into the keyhole slots to attach sofa arms on opposite ends of the sofa back.

4. The upholstered sofa of claim 1 wherein the connectors comprise male threaded members inserted through the sleeve, the male threaded members being attachable to female threaded members in the sofa arms to position the sleeve in an exposed position, the sleeve being received within aligned keyhole slots to attach the sofa arms to the sofa back.

5. The upholstered sofa of claim 4 wherein the sleeve comprises a conical sleeve member.

6. The upholstered sofa of claim 5 wherein the keyhole slots include a beveled slot section, the conical sleeve being received within the beveled slot section to tighten the sofa arms to the sofa back.

7. The upholstered sofa of claim 6 wherein keyhole slots are formed on opposite ends of the sofa back and the connectors are attachable to the sofa arms with the conical sleeves initially exposed.

8. The upholstered sofa of claim 7 wherein the sofa back and the sofa arms are upholstered for shipment, the connectors being covered by upholstered layers when the sofa arms are assembled to the sofa back.

9. The upholstered sofa of claim 8 wherein the sofa deck is insertable into a birdsmouth slot on the sofa back after assembly of the sofa arms to the sofa back, the sofa deck being attachable to front sections of the sofa arms during assembly of the upholstered sofa.

10. The upholstered sofa of claim 9 wherein the sofa back is open for receiving sofa cushions during shipment, and sofa back has a length and width substantially the same as the sofa deck so that the sofa back including cushions can be placed over the sofa deck, with sofa arms positioned therein, for shipment together.

11. A sofa suitable for field assembly and field disassembly, comprising:
    a plurality of seat back sections and separate seat deck sections and arms forming opposite ends of the sofa, the individual seat back sections being joinable end to end to form a seat back that can be field assembled and field disassembled and the individual seat deck sections being joinable end to end to form a seat that can be field assembled and field disassembled, the arms being attachable to opposite ends of the seat back and the seat deck, wherein
    the individual seat back sections include connectors on one end thereof and a keyhole slot on opposite ends thereof, the connectors being insertable into keyhole slots of adjacent seat back sections, wherein
    the connectors include a male fastener with a sleeve extending around the male fastener, the sleeve including a radially projecting conical section extending from a cylindrical shank section, the sleeve extending beyond the seat back to which the connector is mounted, and wherein
    the keyhole slot has an alignment section of the keyhole slot into which a connector can be inserted for subsequent relative movement of one seat back section relative to an adjacent seat back section that moves the sleeve laterally of its axis into a portion of the keyhole slot narrower than the alignment section to secure seat back sections together, wherein the narrower portion of the keyhole slot extending from the alignment section has opposed slot bearing surfaces with beveled edge surfaces extending outwardly away from the bearing surfaces, and wherein the beveled edge surfaces are also inclined toward a closed end of the narrower portion spaced from the alignment section so that the slot bearing surfaces are thicker adjacent the closed end of the narrower portion than adjacent the alignment section so that insertion of the conical section into engagement with the beveled and inclined edge surfaces of the keyhole slot will further tighten the one seat back section relative to the adjacent seat back section and the sleeve cylindrical shank section will be positioned between the slot bearing surfaces.

12. The sofa of claim 11 wherein the seat deck sections also include connectors on one side thereof and keyhole slots on an opposite side thereof, so that the seat deck sections are field attachable by the connectors engaging keyhole slots on an adjacent seat deck section.

13. The sofa of claim 11 wherein the seat back sections and the seat deck sections are upholstered, with the radially projecting conical section of each sleeve protruding beyond an upholstery layer.

14. An upholstered seating item of furniture comprising:
    a first upholstered furniture component;
    a second upholstered furniture component;
    at least one female connector member on said first upholstered furniture component, the female connector member including a key hole slot with a beveled edge extending away from the slot and in which the thickness of the female connector member increases from an entry section of the key hole slot to a closed end of the key hole slot;
    a male connector member having a conical section insertable in the keyhole slot to attach the first upholstered furniture component to the second upholstered furniture component wherein a compressible member is mounted on the male connector member;

upholstery material on at least one of the first and second upholstered furniture components being sandwiched between the first and second upholstered furniture components when attached, with the conical section engaging the beveled edge of the keyhole slot to tighten the attachment of the first and second furniture upholstered components despite dimensional variations due to variability of the upholstery material.

15. The upholstered seating item of furniture of claim 14 wherein upholstery material on both the first and second furniture upholstered components is sandwiched therebetween when the first furniture upholstered component is attached to the second upholstered furniture component.

16. The upholstered seating item of furniture of claim 14 wherein a relatively incompressible washer is mounted on the male connector member.

17. The upholstered seating item of furniture of claim 14 wherein multiple female connector members and multiple male connector member are located on the first and second upholstered furniture components, wherein the first upholstered furniture component can slide relative to the second upholstered furniture component upon initial entry of the conical section of the male connector member into the key hole slot despite the presence of the upholstery material, with the first upholstered furniture component being progressively tightened relative to the second upholstered furniture component as the conical section of the male connector member moves toward the closed end of the keyhole slot in the female connector member.

* * * * *